US008953951B1

(12) United States Patent
Thomas et al.

(10) Patent No.: US 8,953,951 B1
(45) Date of Patent: Feb. 10, 2015

(54) FAST CHROMATIC DISPERSION ESTIMATION

(75) Inventors: Philip A. Thomas, San Jose, CA (US); Christian Malouin, San Jose, CA (US); Theodore John Schmidt, Gilroy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 276 days.

(21) Appl. No.: 13/527,322

(22) Filed: Jun. 19, 2012

(51) Int. Cl.
*H04B 10/06* (2006.01)
(52) U.S. Cl.
USPC ........... 398/208; 398/202; 398/203; 398/204; 398/205
(58) Field of Classification Search
CPC .... H04B 10/6161; H04B 10/60; H04B 10/66; H04B 10/67
See application file for complete search history.

(56) References Cited

U.S. PATENT DOCUMENTS

2013/0136450 A1\* 5/2013 Roberts et al. .................. 398/65

OTHER PUBLICATIONS

University of Wisconsin-Madison, lecture notes, vector spaces, 2002.\*

Malouin et al. "Natural Expression of the Best-Match Search Godard Clock-Tone Algorithm for Blind Chromatic Dispersion Estimation in Digital Coherent Receivers", Advanced Photonics Congress, OSA 2012, 2 pgs.
Proakis et al. "Algorithms for Statistical Signal Processing", Chapter 2, Section 2.14, pp. 110-113, Prentice-Hall, 2001.
Malouin et al. "Efficient, Non-Data-Aided Chromatic Dispersion Estimation via Generalized, FFT-Based Sweep", OFN/NFOEC Technical Digest, OSA, Mar. 17, 2013, 3 pgs.
U.S. Appl. No. 13/854,023, filed Mar. 29, 2013 entitled Fast Chromatic Dispersion Estimation.
Godard, Dominique N. "Passband Timing Recovery in an All-Digital Modem Receiver" IEEE Transactions on Communications, vol. COM-26, No. 5, May 1978, pp. 517-523.
Hauske et al. "Precise, Robust and Least Complexity CD estimation" Optical Fiber Communication Conference and Exposition (OFC/NFOEC), 2011, Mar. 6-10, 2011, 3 pgs.
Soriano et al. "Chromatic Dispersion Estimation in Digital Coherent Receivers" Journal of Lightwave Technology, vol. 29, No. 11, Jun. 1, 2011, pp. 1627-1637.
Gardner, Floyd M. "A BPSK/QPSK Timing-Error Detector for Sampled Receivers" IEEE Transactions on Communications, vol. COM-34, No. 5, May 1986, pp. 423-429.

\* cited by examiner

*Primary Examiner* — Shi K Li
*Assistant Examiner* — Mina Shalaby
(74) *Attorney, Agent, or Firm* — Shumaker & Sieffert, P.A.

(57) ABSTRACT

This disclosure describes the Fast Chromatic Dispersion Estimation (FCDE) techniques which corrects for chromatic dispersion in high data rate optical communications systems such as some coherent optical communications systems. FCDE may utilize transform such as fast-Fourier transforms to estimate the chromatic dispersion. From an estimation of the chromatic dispersion, the techniques may determine filter tap coefficients for compensating the chromatic dispersion.

33 Claims, 6 Drawing Sheets

FAST CHROMATIC DISPERSION ESTIMATION

TECHNICAL FIELD

This disclosure relates to optical communication, and more particularly, to a coherent optical communication system.

BACKGROUND

Optical communication systems potentially suffer from chromatic dispersion (CD). For instance, in optical communication systems the phase velocity of an optical signal depends upon its frequency, causing different harmonics to travel at different rates in an optical link. The longer the distance travelled from transmitter to receiver, the greater the phase difference between different frequencies. This phase difference between different frequencies is referred to as chromatic dispersion, which may negatively affect the capabilities of a receiver in the optical communication system to reconstruct the data encoded in the received optical signal.

SUMMARY

This disclosure describes Fast Chromatic Dispersion Estimation (FCDE) for optical communication systems such as coherent optical communication systems. Chromatic dispersion is a characteristic of an optical medium and the transfer rate at which data is transmitted. Coherent optical communication systems include components that compensate for the chromatic dispersion to reverse the dispersion effect on incoming data channels transmitted over an optical link. For example, a coherent receiver modem may use a chromatic dispersion (CD) filter to compensate 50,000 ps/nm of chromatic dispersion, less than 50,000 ps/nm of chromatic dispersion, or more than 50,000 ps/nm of chromatic dispersion.

As part of compensating for the chromatic dispersion, the optical receiver may estimate the chromatic dispersion. For example, the FCDE techniques may utilize signal transform techniques such as fast-Fourier transforms to reduce the number of multiplications that are needed to estimate the chromatic dispersion. The optical receiver may configure a chromatic dispersion filter based on the estimated chromatic dispersion to filter the chromatic dispersion. In general, it may be desirable to minimize the amount of time needed to filter the chromatic dispersion so as to maintain reliable data channels in the optical communication system. As described in more detail, the FCDE techniques described in this disclosure assist with minimizing the amount of time needed to determine coefficients for the chromatic dispersion filter by minimizing the amount of time needed to estimate the chromatic dispersion.

As discussed in more detail, the optical receiver includes a controller, such as a processor, that computes chromatic dispersion (CD) filter coefficients according to the FCDE techniques described herein. The processor configures the CD filters in the optical receiver to compensate for chromatic dispersion on incoming data channels based on the computed CD filter coefficients. In this manner, the resulting data signals may not include the chromatic dispersion. As described in more detail, FCDE facilitates high speed transmission of data signals by a coherent optical communication system while minimizing signal degradation caused by chromatic dispersion of an optical link through which the high speed data signals are transmitted.

In one example, the disclosure describes a method that includes determining, with a controller, complex conjugate values of a first portion of a frequency domain representation of a combination of one or more input data streams having chromatic dispersion, and pointwise multiplying, with the controller, the complex conjugate values with a second portion of the frequency domain representation of the combination of the one or more input data streams. The method also includes applying, with the controller, a transform to results of the pointwise multiplication, determining, with the controller, filter tap coefficients, based on at least results of the transform, for a chromatic dispersion filter configured to compensate for the chromatic dispersion of the one or more input data streams, and configuring, with the controller, the chromatic dispersion filter in accordance with the determined filter tap coefficients.

In one example, the disclosure describes a controller that is configured to determine complex conjugate values of a first portion of a frequency domain representation of a combination of one or more input data streams having chromatic dispersion. The controller is also configured to pointwise multiply the complex conjugate values with a second portion of the frequency domain representation of the combination of the one or more input data streams. The controller is further configured to apply a transform to results of the pointwise multiplication. Moreover, the controller is configured to determine, based on at least results of the transform, filter tap coefficients for a chromatic dispersion filter configured to compensate for the chromatic dispersion of the one or more input data streams. In some examples, the controller configures the chromatic dispersion filter in accordance with the determined filter tap coefficients.

In one example, the disclosure describes a device that includes a modulator-demodulator (modem) comprising a chromatic dispersion filter. In this example, the modem is configured to receive one or more input data streams having chromatic dispersion, and configured to transform a combination of the one or more input data streams into a frequency domain representation of the combination of the one or more input data streams. The device also includes a controller that is configured to receive the frequency domain representation of the combination of one or more input data streams. The controller is also configured to determine complex conjugate values of a first portion of the frequency domain representation of the combination of input data streams. The controller is also configured to pointwise multiply the complex conjugate values with a second portion of the frequency domain representation of the combination of the one or more input data streams. Furthermore, the controller is configured to apply a transform to results of the pointwise multiplication, and determine, based on at least results of the transform, filter tap coefficients for the chromatic dispersion filter configured to compensate for the chromatic dispersion of the one or more input data streams. The controller also configures the chromatic dispersion filter in accordance with the determined filter tap coefficients.

In one example, the disclosure describes a modulator-demodulator (modem) that includes a chromatic dispersion filter configured to transmit a frequency domain representation of a combination of one or more input data streams having chromatic dispersion to a controller. The chromatic dispersion filter is also configured to receive from the controller filter tap coefficients for compensating the chromatic dispersion that are based on a transform of a pointwise multiplication of complex conjugate values for a first portion of the frequency domain representation of the combination of the one or more input data streams and a second portion of the frequency domain representation of the combination of the one or more input data streams.

In one example, the disclosure describes a method that includes applying, with a controller, a pointwise operation to pairs of data values of a frequency domain representation of a combination of one or more input data streams having chromatic dispersion to produce an intermediate set of data values. In this example, each of the pairs of data values includes a first data value associated with a positive frequency of the frequency domain representation, and a second data value associated with a corresponding negative frequency of the frequency domain representation. The example also includes applying, with the controller, a transform to the intermediate set of data values to compute possible chromatic dispersion values. The example method further includes selecting, with the controller, a chromatic dispersion value from the possible chromatic dispersion values that most closely represents the chromatic dispersion, and configuring, with the controller, a chromatic dispersion filter, based on the selected chromatic dispersion value, to compensate for the chromatic dispersion of the one or more input data streams.

The details of one or more aspects of the disclosure are set forth in the accompanying drawings and the description below. Other features, objects, and advantages of the disclosure will be apparent from the description and drawings, and from the claims.

DETAILED DESCRIPTION

Figure 1:
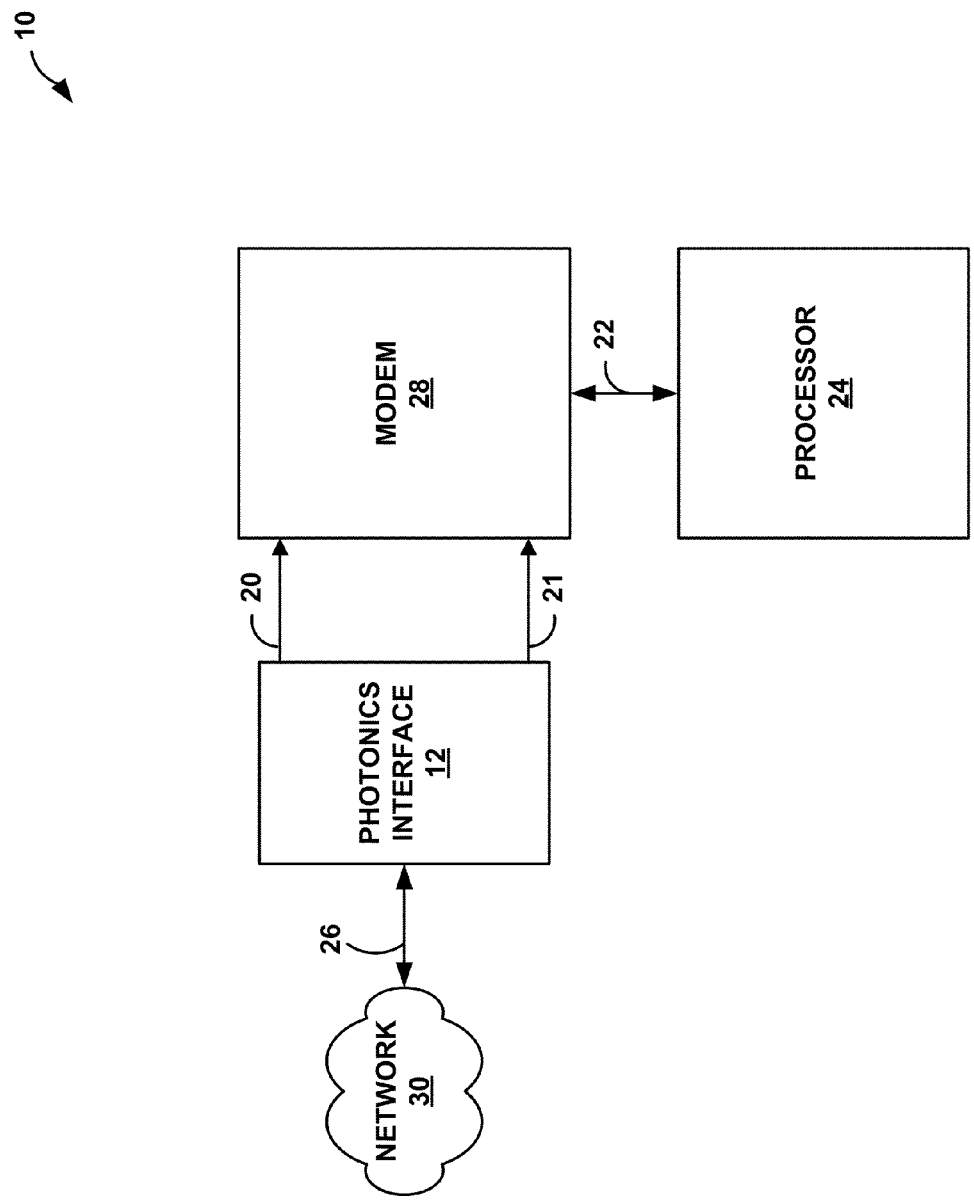
FIG. 1 is a block diagram illustrating a transceiver in an optical communication system in accordance with one or more examples described in this disclosure.

FIG. 1 is a block diagram illustrating a transceiver 10 of an optical communication system. Transceiver 10 includes photonics interface 12 coupled to modem 28 and a controller. An example of the controller is processor 24 illustrated in FIG. 1. Photonics interface 12 is a hardware interface that includes components for transmission and reception of optical data. Examples of modem 28 and the controller include, but are not limited to, a digital signal processor (DSP), a general purpose microprocessor, an application specific integrated circuit (ASIC), a field programmable gate array (FPGA), a combination thereof, or other equivalent integrated or discrete logic circuitry. For purposes of illustration, modem 28 may be a DSP, and the controller, an example of which is processor 24, may be a general purpose microprocessor or an ASIC.

Transceiver 10 is part of an optical communication system such as a wavelength-division multiplexing (WDM) system, including a dense wavelength division multiplexing (DWDM) system. However, aspects of this disclosure are not limited to WDM systems. For purposes of illustration only and for ease of description, the examples are described in context of a WDM system.

In a WDM system, modem 28 of transceiver 10 receives electrical data streams from multiple devices such as switches or routers that are serialized together. Modem 28 encodes the received data streams utilizing any one of a variety of modulation schemes, and transmits the modulated data as electrical data streams to photonics interface 12. Photonics interface 12 converts the electrical data streams to an optical signal for further transmission into network 30 via optical link 26. Network 30 may be any type of network that allows different devices to communicate with one another. For instance, examples of network 30 include, but are not limited to, a wide area network (WAN) or the Internet.

In the reverse, photonics interface 12 receives optical signals via optical link 26 from network 30, and converts the optical signals to electrical data streams. Modem 28 receives the electrical data streams from photonics interface 12, and demodulates the electrical data streams to generate demodulated electrical data streams. Modem 28 or some other device deserializes the demodulated electrical data stream into a plurality of electrical data streams, and transmits each of the plurality of electrical data streams to respective routers and switches.

Photonics interface 12 may receive an optical signal in a long haul application (e.g., from a transmitter that is many miles away). In such examples, the received optical signal may suffer from chromatic dispersion (CD). For example, the optical signal transmitted by network 30 may be considered as a combination of discrete waves with different frequencies. One characteristic of optical link 26 may be that optical link 26 affects the phase velocity of each of the waves based on the frequency of the wave, which may be considered as the CD caused by optical link 26. In other words, when the optical signal travels through optical link 26 with residual CD, optical link 26 causes the phase velocity of each of the waves to be different.

This difference in phase velocity as a function of frequency is referred to as chromatic dispersion (CD), and negatively impacts the signal integrity. For example, CD may cause inter-symbol-interference (ISI). In some examples, the optical signal that network 30 transmits may be a combination of different encoded optical data streams that are each encoded from different electrical data streams (i.e., the combination of discrete waves). ISI refers to symbol interference between any of the encoded optical signals and/or interference between the symbols of the electrical data stream used to encode an optical signal. This ISI may make it difficult for transceiver 10 to decode the encoded data streams.

For example, the optical signal that photonics interface 12 receives suffers from chromatic dispersion, and when photonics interface 12 converts the optical signal into a plurality of electrical data streams, the electrical data streams suffer from the chromatic dispersion. In this way, the electrical data streams outputted by photonics interface 12 may be different than the electrical data streams that were used to generate the optical signal that network 30 transmitted to photonics interface 12 because of the chromatic dispersion. As described in more detail, modem 28 compensates for the chromatic dispersion so that the resulting electrical data streams may not suffer from the chromatic dispersion from optical link 26. Modem 28 may also compensate for the other impairments that distort the optical signal. In this way, the resulting electrical data streams may be similar to the electrical data streams used to generate the optical signal that network 30 transmits via optical link 26.

In some examples, the data rate of the optical signal that network 30 or photonics interface 12 transmits may be relatively high. For example, the data rate of the optical signal in optical link 26 may be approximately 100 gigabits per second (Gbps). Transmitting an optical signal at 100 Gbps may require complex modulation scheme such as phase-shift keying (PSK). One example of PSK is quadrature phase-shift keying (QPSK), although other modulation schemes are possible, such as binary phase-shift keying (BPSK), "Multilevel M-ary" quadrature amplitude modulation (M-QAM where M>4), or orthogonal frequency division multiplexing (OFDM), as a few examples. For purposes of illustration, the example techniques are described with respect to QPSK modulation, sometimes referred to as 4-QAM. However, aspects of this disclosure should not be considered so limiting. The techniques described in this disclosure are extendable to other modulation schemes such as those used for coherent optical communication systems. For instance, QPSK, BPSK, M-QAM, and OFDM modulation schemes may each require coherent optical detection, and photonics interface 12, modem 28, and processor 24 may be considered as being part of a coherent optical communication system.

Coherent optical communication systems refer to optical systems that utilize both magnitude and phase information for transmitting and receiving data such as for phase-shift keying modulation (e.g., BPSK or QPSK modulation) or for M-QAM. For instance, coherent optical communication systems may require using a carrier phase reference generated at photonics interface 12 for the reception of data streams from network 30. For example, as illustrated in more detail with respect to FIG. 3, photonics interface 12 may include lasers, phase shifting optical hardware, and optical hybrid mixers to convert the received optical signal into pairs of data streams for transmission to modem 28.

In PSK modulation, binary ones and zeros are represented by changing, or modulating, the phase of a carrier wave sometimes referred to as a lightwave. In this manner, both the magnitude and the phase of the optical signal are used to encode the electrical data streams. For example, both the magnitude and the phase information of the received optical signal may be needed to recover the encoded electrical data streams.

In some examples, in addition, the modulated lightwave in one polarization may be multiplexed with another modulated polarization, which may be orthogonal to the previous one, to produce a polarization multiplexed (PM) signal, such as PM-QPSK. In this way, PM-QPSK may be considered as a combination of two QPSK lightwave signals, where a first QPSK lightwave signal is for a first polarization of the lightwave, and the second QPSK lightwave signal is for a second polarization of the lightwave. Each of the QPSK lightwave signals utilizes four phases to encode two bits per symbol. Accordingly, PM-QPSK modulation utilizes four phases to encode two bits per symbol per polarization, which results in four bits per symbol.

For example, PM-QPSK modulation requires four input electrical data streams to impart the complex information on the optical carrier, two for each polarization. The electrical signal for each polarization contains a pair of in-phase (I) and quadrature (Q) data streams that represent the complex data waveform. For example, in PM-QPSK modulation, there may be two in-phase data streams and two quadrature data streams, and one in-phase (I) data stream and one quadrature (Q) data stream forms one pair of a complex number, and the other I data stream and the other Q data stream forms another pair of a complex number. Each of the in-phase and quadrature data stream pairs may be nominally orthogonal to one another, in polarization, once the electrical data streams impart their complex information on the optical carrier. Each of these I or Q electrical data streams can be single-ended or differential.

For example, in PM-QPSK modulation, the input optical signal includes two lightwaves that are polarized orthogonally with respect to one another (e.g., one is horizontally polarized light, and the other is vertically polarized light, as an illustrative example, or both are circularly polarized, as another example). For ease of description, one of the lightwaves may be referred to as lightwave with polarization 1, and the other as lightwave with polarization 2. Each of the lightwaves may be associated with a particular magnitude and phase. The magnitude and phase of each of the lightwaves may be represented as a complex signal that includes real and imaginary parts. In some examples, the frequency of each of the lightwaves may also be represented as part of the complex signal.

For example, for PM-QPSK modulation, photonics interface 12 receives an optical signal via optical link 26 that includes lightwave with polarization 1 and lightwave with polarization 2. Optical components within photonics interface 12 extract the lightwave with polarization 1 and the lightwave with polarization 2 from the received optical signal. The optical components further mix the lightwave with polarization 1 with a lightwave output from a local oscillator within photonics interface 12 to generate an in-phase optical data stream, referred to as $I_1$ to indicate that it is for the lightwave with polarization 1, and to generate a quadrature optical data stream, referred to as $Q_1$ to indicate that it is for the lightwave with polarization 1. The $I_1$ data stream is proportional to the real aspect of the complex signal of the lightwave with polarization 1, and the $Q_1$ data stream is proportional to the imaginary aspect of the complex signal of the lightwave with polarization 1 (or vice-versa).

Similarly, the optical components also mix the lightwave with polarization 2 with a lightwave output from a local oscillator within photonics interface 12 to generate an in-phase optical data stream, referred to as $I_2$ to indicate that it is for the lightwave with polarization 2, and to generate a quadrature optical data stream, referred to as $Q_2$ to indicate that it is for the lightwave with polarization 2. Similar to $I_1$ and $Q_1$, the $I_2$ data stream is proportional to the real aspect of the complex signal of the lightwave with polarization 2, and the $Q_2$ data stream is proportional to the imaginary aspect of the complex signal of the lightwave with polarization 2 (or vice-versa).

In this manner, the pairs of I/Q optical data streams (e.g., a first pair that includes $I_1$ and $Q_1$, and a second pair that includes $I_2$ and $Q_2$) together represent the received optical signal. For example, $I_1$ and $Q_1$ together represent the specific magnitude and phase of the lightwave with polarization 1, and $I_2$ and $Q_2$ together represent the specific magnitude and phase of the lightwave with polarization 2. In some examples, the $I_1$, $Q_1$, $I_2$, and $Q_2$ may also represent frequency of respective lightwaves. Also, in this example, the lightwave with polarization 1 and the lightwave with polarization 2 together form the received optical signal. However, due to chromatic dispersion, the received optical signal may not be the same as the transmitted optical signal.

Components within photonics interface 12 convert the two pairs of I and Q optical data streams into two pairs of I and Q electrical data streams (e.g., $I_1$ and $Q_1$ electrical data streams, and $I_2$ and $Q_2$ electrical data streams) referred to as pairs of I/Q electrical data streams for ease of reference. For example, as illustrated in FIG. 1, photonics interface 12 transmits a first pair of I/Q data streams (e.g., $I_1Q_1$ data streams 20) and a second pair of I/Q data streams (e.g., $I_2Q_2$ data streams 21). As discussed above, the signal integrity of the optical signal transmitted by network 30 may be degraded by chromatic dispersion when transmitted via optical link 26 to photonics interface 12. This chromatic distortion may be carried through to the I/Q data stream pairs transmitted by photonics interface 12 to modem 28 (e.g., $I_1Q_1$ data streams 20 and $I_2Q_2$ data streams 21).

For example, $I_1Q_1$ and $I_2Q_2$ data streams may electrically represent the chromatic dispersion of the received optical signal. For instance, the optical signal transmitted by network 30 may be formed by $I_1Q_1$ and $I_2Q_2$ electrical data streams that represented the encoded data to be transmitted. Due to at least chromatic dispersion, the optical signal received by photonics interface 12 may be different than the transmitted optical signal. Because photonics interface 12 constructs $I_1Q_1$ data streams 20 and $I_2Q_2$ data streams 21 from the received optical signal, $I_1Q_1$ data streams 20 and $I_2Q_2$ data streams 21 may be different from the $I_1Q_1$ data streams and $I_2Q_2$ data streams used to encode the transmitted data.

Accordingly, in some examples, it is desirable to compensate for the chromatic dispersion so that $I_1Q_1$ data streams 20 and $I_2Q_2$ data streams 21. In aspects described in this disclosure, modem 28 compensates for the chromatic dispersion that is electrically present on $I_1Q_1$ data streams 20 and $I_2Q_2$ data streams 21.

As described in more detail, modem 28 includes chromatic dispersion (CD) filters that compensate for the chromatic dispersion. These CD filters may be digital filters such as finite impulse response (FIR) or infinite impulse response (IIR) filters. The amount of compensation that the CD filters apply is based on filter tap coefficients of the CD filters. As also described in more detail, the controller (e.g., processor 24) may configure the CD filters of modem 28 based on the filter tap coefficients determined by the controller.

It may be difficult to predetermine the filter tap coefficients. For example, optical link 26 may represent a particular combination of different optical links to network 30. In a coherent optical communication system, the combination of different optical links that couple photonics interface 12 to network 30 may change. This change in combination of optical links to network 30 changes the amount of chromatic dispersion in the optical signal that photonics interface 12 receives.

Because the amount of chromatic dispersion may change, the CD filters of modem 28 may be configurable to compensate for different amounts of chromatic dispersion. For instance, FIG. 1 illustrates processor 24. Processor 24 is configured to determine an estimate of the amount of chromatic dispersion, and determine the filter tap coefficients of the CD filters of modem 28 based on the estimated amount of chromatic dispersion so that the CD filters of modem 28 compensate for the chromatic dispersion. Processor 24 may then configure the CD filters based on the determined filter tap coefficients.

For example, chromatic dispersion may be function of the length of optical link 26. However, it may be difficult to predict the length of optical link 26; accordingly, it may be difficult to predetermine the amount of chromatic dispersion that optical link 26 will add. Therefore, processor 24 may estimate the chromatic dispersion added by optical link 26, rather than receive a value or be preprogrammed with a value that indicates how much chromatic dispersion optical link 26 added.

Based on the estimation of the chromatic dispersion, processor 24 determines coefficients for the filter taps of the CD filters within modem 28, and transmits the values as coefficient values 22 to modem 28 (e.g., as one way in which processor 24 configures the CD filters of modem 28 with the filter tap coefficients). The CD filters compensate for the chromatic dispersion caused by optical link 26, which is represented electrically on I/Q data streams 20 and 21, based on the determined coefficients for the filter taps.

In some examples, processor 24 may not need to continuously estimate the chromatic dispersion. For example, once an optical link to network 30 is established, processor 24 may determine an estimation of the chromatic dispersion. After determining an estimation of the chromatic dispersion, processor 24 may not need to repeatedly determine an estimation of the chromatic dispersion because the amount of chromatic dispersion may not change, change slightly, or change relatively slowly over time. In some instances, because the amount of chromatic dispersion may change relatively slowly over time, processor 24 may periodically re-estimate the chromatic dispersion. However, the frequency of re-estimation (e.g., the number of times processor 24 re-estimates the chromatic dispersion per unit of time) may be relatively small.

Because processor 24 may not need to continuously estimate the chromatic dispersion, processor 24 may not need to continuously update the filter coefficients. Accordingly, the CD filters within modem 28 may not need to be continuously adaptable. For example, the CD filters within modem 28 need not be adaptable in the least mean squares (LMS) sense.

For example, the CD of optical link 26 may be affected by the ambient temperature surrounding optical link 26 which is usually buried underground. This may result in a slow change in the CD typically requiring hours, days or months to create an appreciable change of the residual CD of a given link. Because the CD change happens slowly relative to the I/Q symbol duration, there may be no need to adapt a FIR filter using a least-mean-square (LMS) algorithm where an error feedback is calculated almost every symbol or every group of N symbols to track other fast optical changes (for example, the polarization changes due to the fiber birefringence modifications created by mechanical vibrations happening over micro second time frame (much faster than the change of CD).

While processor 24 may not need to continuously estimate the chromatic dispersion, when optical link 26 to network 30 changes, which causes a change in the amount of chromatic dispersion, the CD filters within modem 28 may need to be configured for compensating the chromatic dispersion in a relatively short period of time so that modem 28 is ready to decode the encoded data in relatively short period of time. To allow the CD filters within modem 28 to compensate the chromatic dispersion relatively quickly, processor 24 may be configured to determine an estimation of the chromatic dispersion relatively quickly (e.g., within 5 milli-seconds (ms)).

For example, it may be desirable to minimize link bring-up time (e.g., the amount of time before data received via optical link 26 can be reliably decoded). One of the factors that affects the link bring-up time is the amount of time processor 24 takes to determine an estimation of the chromatic dispersion. For instance, decreasing the amount of time processor 24 takes to estimate the chromatic dispersion, results in a decrease in the amount of time it takes to configure the CD filters of modem 28. A decrease in the amount of time it takes to configure the CD filters of modem 28 results in a decrease in the link bring-up time.

As described in more detail, processor 24 is configured to implement a Fast Chromatic Dispersion Estimation (FCDE) technique (e.g., techniques that minimize the time that processor 24 takes to estimate the chromatic dispersion). In accordance with the FCDE technique, processor 24 exploits the mathematical expressions of transforms, such as fast-Fourier transform (FFT) techniques, to sweep through possible values of the chromatic dispersion until processor 24 identifies a chromatic dispersion value that most closely approximates the actual chromatic dispersion value.

For example, as part of the FCDE techniques, processor 24 may determine an FFT of a multiplied version of the received I/Q data pairs that have been converted to the frequency domain. For instance, processor 24 may implement a first FFT to convert the I/Q pairs of data streams into the frequency domain. Processor 24 may determine complex conjugate values for a first portion of the I/Q pairs of data streams in the frequency domain. Processor 24 may multiply the determined complex conjugate values with a second portion of the I/Q pairs of the data streams in the frequency domain. Processor 24 may then implement a second FFT on the resulting multiplied data streams to determine an automatic sweep of the chromatic dispersion where the highest peak may be considered as the best-matching value that corresponds to an estimation of the actual link chromatic dispersion.

It should be understood that while the techniques described in this disclosure are described with an FFT, aspects of this disclosure are not so limited. For example, an FFT is generally a faster version of a discrete Fourier transform (DFT). For example, an FFT utilizes an algorithm that performs similar tasks as those of a DFT, but in much less time. Accordingly, in some examples, rather than an FFT, the techniques may utilize a DFT. However, for purposes of illustration, and because the FFT is generally faster than a DFT, the techniques are described with respect to an FFT.

Utilizing FCDE techniques to determine an estimation of the chromatic dispersion reduces the number of computations that are necessary to determine the estimation of the chromatic dispersion as compared to other techniques that do not utilize multiple transforms to determine an estimation of the actual chromatic dispersion. This reduction in the number of computations allows for a reduction in the amount of time needed to determine the estimation of the chromatic dispersion.

Furthermore, utilizing the FCDE techniques described in this disclosure may allow for processor 24 to determine an estimation of the chromatic dispersion without requiring special training sequences. As one example, when the established optical link 26 changes, in some other examples, network 30 transmits a special training sequence that processor 24 utilizes to determine an estimation of the chromatic dispersion. However, the transmission of the special training sequence consumes bandwidth and potentially delays the amount of time before the CD filters of modem 28 can compensate for the chromatic dispersion on the actual data (e.g., the actual encoded data that follows the special training sequence).

By avoiding the requirement of a special training sequence, and avoiding a requirement of a-priori knowledge as to amount of chromatic dispersion that will be added, the FCDE technique that processor 24 implements may be considered as processor 24 determining an estimation of the chromatic dispersion in blind mode. It should be understood that although not necessary, it may still be possible to utilize special training sequences in aspects of this disclosure.

As described above, the FCDE technique utilizes transforms such as FFTs (and possibly DFTs) to reduce the number of operations as compared to other techniques. For purposes of illustration, the following describes these other techniques to assist with the understanding of the transforms implemented by processor 24 in accordance with the FCDE techniques.

These other techniques and the FCDE techniques described herein are based on the Godard Clock-Tone and Best-Match Search Techniques. For example, the Godard Clock-Tone technique refers to determining an auto-correlation (acorr) of an input signal in the frequency domain that is sampled at Rs, where Rs equals 2*R, but may be less than 2*R and greater than R, and R is the symbol rate. The Godard Clock-Tone refers to a clock-tone, at a frequency $f_b$ that equals R, which is generated by the auto-correlation of the signal spectrum multiplied by a weighting factor. In general, the power of the clock-tone at frequency $f_b$ equals R is proportional to the quality of the data stream, and the clock-tone at frequency $f_b$ is referred to as the Goddard Clock-Tone.

For example, the equation for determining the power of the auto-correlation as a function of frequency ($f_b$) is given below.

$$C(f_b)=|\text{acorr}(Y(f))|f_b|^2 \qquad \text{(equation 1)}.$$

In equation 1, $C(f_b)$ is the clock-tone power calculated at frequency $f_b$, and Y is the frequency domain representation of an incoming signal y(t) (i.e., Y=FFT {y(t)}).

In general, the acorr of Y(f) is given by:

$$\int Y^*(f)Y(f+f_b)df \qquad \text{(equation 2)}.$$

In equation 2, * denotes the complex conjugate. Substituting equation 2 into equation 1 results in $C(f_b)$ equaling:

$$|\int Y^*(f)Y(f+f_b)df|^2 \qquad \text{(equation 3)}.$$

At frequency $f_b$=R or at lag N/2, where N is the FFT size of Y (e.g., the number of transform bins in the FFT), the numerical auto-correlation for a discrete frequency domain representation, which results in changing the integral for a summation, is given by:

$$C(N/2) = \left| \sum_{n=0}^{N/2-1} Y^*(n)Y(n+N/2) \right|^2. \quad \text{(equation 4)}$$

In equation 4, the frequency domain representation of the incoming signal is represented as a discrete function, rather than as a continuous function. For example, "n" represents a frequency domain sample, and is an integer value. Accordingly, there is one discrete value for Y, for each frequency domain sample value "n." N is the number of points in the FFT, and refers to the number of points in the FFT used to convert the original incoming data stream into the frequency domain. In this disclosure, the phrase "the number of points in a transform" (e.g., FFT), "a length of the transform," "a size of the transform," and "a number of transform bins in the transform" may be used interchangeably.

For example, as indicated above, "y(t)" represents the incoming data streams (e.g., any of the combined $I_1Q_1$ data streams 20 and $I_2Q_2$ data streams 21 that modem 28 receives, where y(t)=I(t)+jQ(t) is a complex function representing the combined inputs of polarization 1 or polarization 2). However, y(t) may be the original one of the combined $I_1Q_1$ data streams and $I_2Q_2$ data streams having the chromatic dispersion. For instance, $I_1Q_1$ data streams 20 may be the $I_1Q_1$ data streams used with polarization 1 that have been degraded by the chromatic dispersion, and $I_2Q_2$ data streams 21 may be the $I_2Q_2$ data streams used with polarization 2 that have been degraded by the chromatic dispersion.

The chromatic dispersion may be considered as an all-pass filter with a transfer function in the frequency domain of CD(f) equals $\exp(jkf^2)$, where "j" is the imaginary number, "k" is an unknown coefficient, and "f" is frequency. For an optical fiber, k equals $(\pi\lambda^2/c)(DL)$, where $\lambda$ is the wavelength of the optical carrier, c is the speed of light, and DL is the cumulative chromatic dispersion usually given in units of ps/nm or nanoseconds (ns)/nm. In this case, the value of DL may be unknown, resulting in the value of k being unknown. The value of DL represents the total amount of chromatic dispersion, and the techniques described in this disclosure may be directed to determining the value of DL, with which the techniques may determine filter tap coefficients for the CD filters within modem 28 (in other words, the k value).

Accordingly, assume that "o(t)" is the original one of combined data $I_1Q_1$ and $I_2Q_2$ that is used to modulate the optical signal that photonics interface 12 receives, and O(f) is the frequency domain representation of o(t) (e.g., O(f) equals the FFT(o(t))). Because y(t) is the original data stream having the chromatic dispersion, and Y(f) is the frequency domain representation of y(t), then Y(f) equals O(f) multiplied by $\exp(jkf^2)$ (i.e., $Y(f)=O(f)\exp(jkf^2)$).

Mathematically, it may be possible to compensate for the chromatic dispersion by multiplying Y(f) by the inverse of the equation for the chromatic dispersion. For example, the inverse of the equation for the chromatic dispersion (i.e., $\exp(jkf^2)$) is $\exp(-jkf^2)$. Therefore, $Y(f)\exp(-jkf^2)$ equals O(f). In other words, $O(f)=O(f)\exp(jkf^2)\exp(-jkf^2)$ because the two exponent terms cancel each other out. For ease of description w(f) equals $\exp(-jkf^2)$.

As described above, the power of the Goddard Clock-Tone is a function of the quality of the signal. Therefore, determining the power of the Goddard Clock-Tone based simply on Y(f) may not result in substantial power at the Goddard Clock-Tone due to the chromatic dispersion that degrades the quality of the data stream. In some examples, by multiplying Y(f) and w(f), and performing the auto-correlation in the manner described above with respect to equations (1) to (4) may result in substantial power at the Goddard Clock-Tone because w(f) compensates for the degradation in the data stream quality caused by the chromatic dispersion.

However, as described above, the value of the coefficient "k" may be unknown. For example, w equals $\exp(-jkf^2)$, but the value of "k" is not known. In some other techniques such as the Best-Match Technique, a processor, similar to processor 24, may sweep through incremental values of k, and for each value of k determine the power of the Goddard Clock-Tone for Y(f)w(f). As described above, k equals $(\pi\lambda^2/c)(DL)$. In this example, the processor in the Best-Match Technique may select a value of DL, and therefore, result in selecting a value of k, and determine the value of w(f) for that selected value k. The processor may then multiply the resulting value with Y(f), and implement equations (1) to (4) on the resulting function to determine the value of C(N/2) for the selected value of k. The processor in the Best-Match Technique may then select a new value of DL, and repeat the process until the processor finds the value of k that maximizes the value of C(N/2). From the value of k that maximizes the value of C(N/2), the processor in the Best-Match Technique may determine an estimation of the chromatic dispersion represented by the variable DL because as described above k equals $(\pi\lambda^2/c)(DL)$.

While the Best-Match Technique may be capable of determining an estimation of the chromatic dispersion, the number of computations needed may be too high to achieve fast estimation. For example, assume $N_{CD}$ indicates the number of values of k that are applied. As one example, $N_{CD}$ is equal to 500 for a resolution of 200 ps/nm for a chromatic dispersion range of +/−50 ns/nm. In other words, if it is assumed that the chromatic dispersion is between +/−50 ns/nm, and resolution for estimating the chromatic dispersion is 200 ps/nm, then, in this example, the processor would need to sweep through 500 different values of k. If the size of the FFT (e.g., the number of transform bins of the FFT) is assumed to 512, then the Best-Match Technique may require 384,000 operations (i.e., 1.5*512*500). In general, the number of operations needed by the Best-Match Technique may be calculated as $1.5*N*N_{CD}$.

In examples described in this disclosure, processor 24 may implement the FCDE technique to determine an estimation of the chromatic dispersion. As described in more detail, the FCDE technique may be mathematically equivalent to the Best-Match Technique; however, the FCDE may require fewer computations. For example, processor 24 may perform an additional transform (such as an FFT), instead of the "k" sweep done for the Best-Match Technique. In some instances, processor 24 may perform $0.5N(1+\log_2 N)$ operations to determine an estimation of the best-matching chromatic dispersion value that best matches the actual chromatic dispersion.

Figure 2:
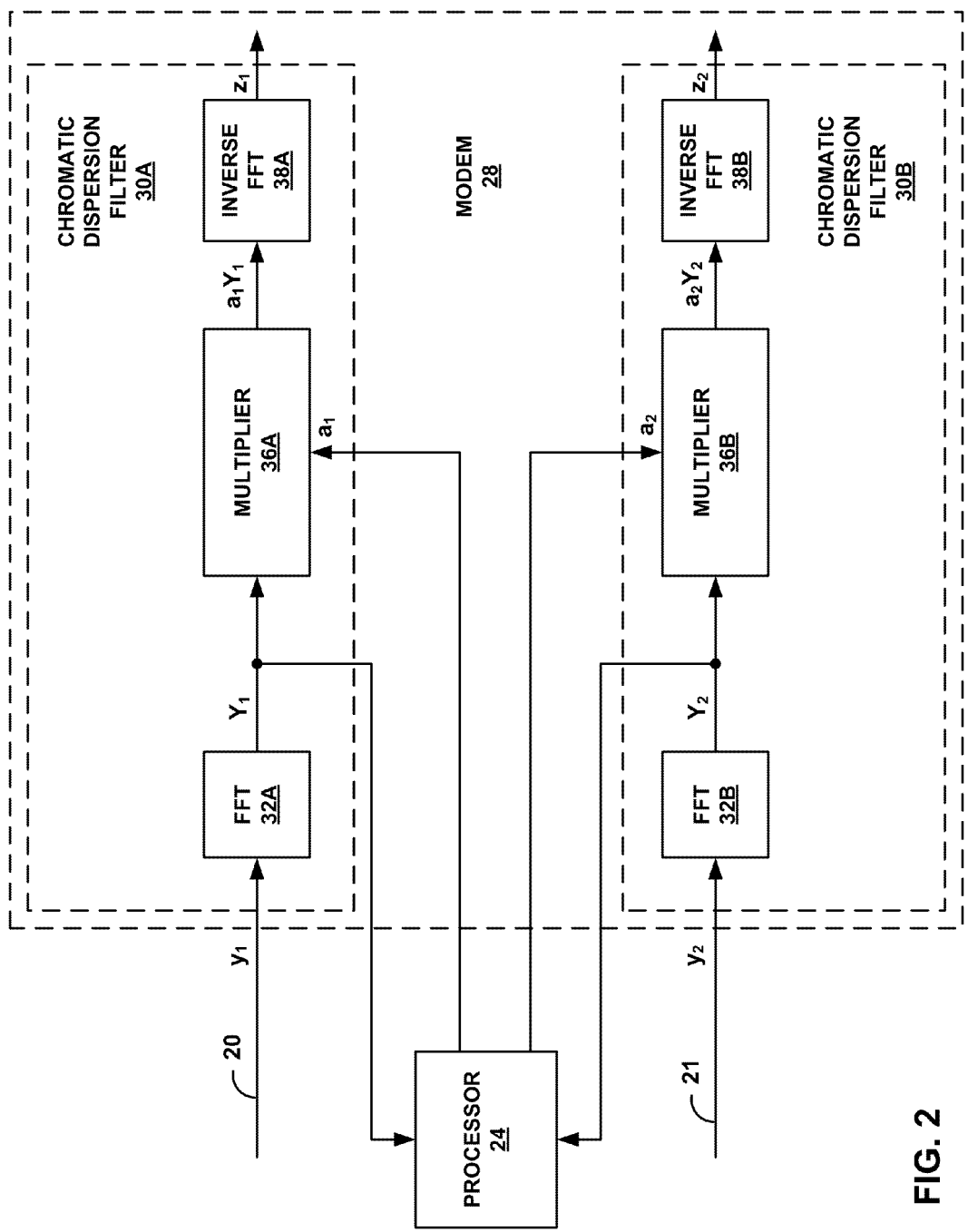
FIG. 2 is a block diagram illustrating chromatic dispersion (CD) filters of a modem in greater detail.

FIG. 2 is a block diagram illustrating chromatic dispersion (CD) filters of a modem in greater detail. For example, as illustrated in FIG. 2, modem 28 includes chromatic dispersion (CD) filter 30A and CD filter 30B. CD filter 30A and CD filter 30B may each receive pairs of the IQ data streams. For instance, CD filter 30A receives $I_1Q_1$ data streams 20, and CD filter 30B receives $I_2Q_2$ data streams 21. For ease of description, in FIG. 2, combined $I_1Q_1$ data streams 20 are represented by $y_1(t)$, and combined $I_2Q_2$ data streams 21 are represented by $y_2(t)$. For example, $y_1(t)$ equals $I_1(t)+jQ_1(t)$, and $y_2(t)$ equals $I_2(t)+jQ_2(t)$.

In the example of FIG. 2, CD filter 30A includes fast-Fourier transform (FFT) module 32A, multiplier 36A, and inverse FFT module 38A. CD filter 30B includes substantially similar components such as FFT module 32B, multiplier 36B, and inverse FFT module 38B. As illustrated, FFT module 32A and FFT module 32B receive $y_1(t)$ and $y_2(t)$ respectively, and convert $y_1(t)$ and $y_2(t)$ into the frequency domain representation. For example, FFT module 32A converts $y_1(t)$ (sampled at a sampling rate of Rs) into $Y_1(n)$, where n is the bins of the FFT. FFT module 32B performs similar functions to output $Y_2(n)$. It should be understood that while FFTs are described as the manner in which to perform the transform, aspects of this disclosure are not so limited, and other techniques that convert the time-domain data streams $y_1(t)$ and $y_2(t)$ into the frequency domain representations may be utilized, such as discrete Fourier transforms (DFTs).

In some examples, the sampling rate of Rs may be substantially equal to the twice the baud rate (R) of $y_1(t)$ and $y_2(t)$. In other words, in these examples Rs may substantially equal 2*R. However, aspects of this disclosure are not so limited. In other examples, the sampling rate may be less than or equal to 2*R, and may be greater than R. In other words, in these examples, Rs may be represented as R<Rs≤2R.

Processor 24 receives $Y_1(n)$ and $Y_2(n)$, and utilizes $Y_1(n)$ and $Y_2(n)$ respectively to determine an estimation of the chromatic dispersion. For example, processor 24 receives $Y_1(n)$ and computes its complex conjugate ($Y_1^*(n)$) from n equals 0 to (N/2)−1, and pointwise multiplies the result with $Y_1(n)$ from N/2 to N−1 which may also be written as $Y_1(n+N/2)$ over the transform bins from n equals 0 to (N/2)−1. Processor 24 uses the result of this multiplication to perform an FFT of size N/2. The power of this FFT is related to the Godard clock tone power. The peak of the power of the FFT represents the best match of the CD as determined by FCDE.

In other words, "N" represents the number of transform bins used to convert the input signals ($y_1(t)$ and $y_2(t)$) into the frequency domain. For example, FFT 32A receives $y_1(t)$, which is in the time domain, and outputs $Y_1(n)$ in the frequency domain. Processor 24 receives $Y_1(n)$ and may determine complex conjugate values for a first portion of $Y_1(n)$, where the first portion includes the values of $Y_1(n)$ from n equals 0 to N/2−1. Processor 24 may pointwise multiply the complex conjugate values for the first portion with a second portion of $Y_1(n)$, where the second portion includes the values of $Y_1(n)$ from n equals N/2 to N−1.

The pointwise multiplication may be considered as processor 24 multiplying a complex conjugate value in the first portion with a value in the second portion that is N/2 transform bins away. For instance, in pointwise multiplication, processor 24 multiplies $Y_1^*(0)$ with $Y_1(N/2)$, multiplies $Y_1^*(1)$ with $Y_1(1+N/2)$, and so forth.

Moreover, it should be noted that the first portion and the second portion, as described above, are described for illustrative purposes and should not be considered limiting. For instance, in an alternate example, the first portion may be values of $Y_1(n)$ from n equals N/2 to N−1, and the second portion may be values of $Y_1(n)$ from n equals 0 to N/2−1. In this example, similar to above, processor 24 may determine the complex conjugate values for the first portion and pointwise multiply the complex conjugate values for the first portion with the second portion; however, in this example, the first portion is from n equals N/2 to N−1, and the second portion is from n equals 0 to N/2−1.

In some examples, the $Y_1(n+N/2)$ values may be substantially the same as the values for $Y_1(-n)$. In this way, the techniques described in this disclosure may be considered as multiplying complex conjugate values of the positive frequency values of the signal Y with corresponding (e.g., mirroring) negative frequency values of the signal Y. Alternatively, the techniques described in this disclosure may be considered as multiplying complex conjugate values of the negative frequency values of the signal Y with the corresponding positive frequency values of the signal Y.

Processor 24 may then apply a transform to a result of the pointwise multiplication. For example, the transform may also be an FFT. In this example, the number of bins in this FFT may be N/2. In other words, FFT 32A may apply a transform to $y_1(t)$ using N transform bins to determine $Y_1(n)$. Processor 24 may perform another FFT of the pointwise multiplication, as described above, using N/2 transform bins.

Processor 24 may then determine the power of the result of the transform, which may be related to the Godard clock-tone power. Accordingly, the peak power of the results of the FFT may represent the best-match for the estimate of the chromatic dispersion. In some examples, it may not be necessary to determine the power. For instance, the absolute value of the FFT also corresponds to the maximum power value of the FFT. In this case, the transform bin where the value of the FFT is maximized may be sufficient to determine the estimate of the chromatic dispersion.

In this manner, in some examples, processor 24 may apply a pointwise operation to pairs of data values of a frequency domain representation of an input data stream having chromatic dispersion. For example, the frequency domain representation of the input data stream may be Y(n), and each of the data values may represent the data value associated with Y(n), for each value of n. For example, a first data value of the frequency domain representation of the input data stream may be Y(0), a second data value of the frequency domain representation of the input data stream may be Y(1), and so forth.

In this example, each of the pairs of data values includes a first data value associated with a positive frequency of the frequency domain representation of the input data stream, and a second data value associated with a corresponding negative frequency of the frequency domain representation of the input data stream. For instance, if the first data value of the pair is Y(n), where n is an integer value, then the second data value may be Y(−n) because −n is the corresponding negative frequency of n.

The pointwise operation may be a pointwise multiplication of the complex conjugate of each of the first data value in the pairs of data values with the second data value in the pairs of data values. Alternatively, the pointwise operation may be a pointwise multiplication of the complex conjugate of each of the second data value in the pairs of data values with the first data value in the pairs of data values. The results of the pointwise operation may be referred to as an intermediate set of data values.

Processor 24 may apply a transform to the intermediate set of data values to compute possible chromatic dispersion values. Processor 24 may then select a chromatic dispersion value, which may be an estimation for the chromatic dispersion, from the possible chromatic dispersion values, where the selected chromatic dispersion value most closely represents the chromatic dispersion of the input data stream.

In the examples described above, processor 24 may receive $Y_1(n)$ or $Y_2(n)$ and perform the FCDE techniques described above to estimate the chromatic dispersion. However, aspects of this disclosure are not so limited. In some examples, processor 24 may receive a frequency domain representation of a combination of one or more input data streams.

For example, $y_1(t)$ equals $I_1(t)+jQ_1(t)$, where $I_1$ and $Q_1$ represent one polarization of the received optical signal, and $y_2(t)$ equals $I_2(t)+jQ_2(t)$, where $I_2$ and $Q_2$ represent another polarization of the received optical signal. In some examples, rather than receiving the frequency domain representation of the $y_1(t)$ (i.e., $Y_1(n)$) or $y_2(t)$ (i.e., $Y_2(n)$), processor 24 may receive a frequency domain representation of a combination of $y_1(t)$ and $y_2(t)$. For example, processor 24 may receive, from modem 28, a frequency domain representation of $y_1(t)$ plus $y_2(t)$, $y_1(t)$ minus $y_2(t)$ or vice-versa, $y_1(t)$ plus $j*y_2(t)$, $j*y_1(t)$ plus $y_2(t)$, $y_1(t)$ minus $j*y_2(t)$, and $j*y_1(t)$ minus $y_2(t)$. Other combinations of $y_1(t)$ and $y_2(t)$ may be possible.

Processor 24 may implement the FCDE techniques described above on any one or more of these frequency domain representations, in some examples. Processor 24 may then sum the results of the FCDE techniques applied to the one or more frequency domain representations. From the resulting sum, processor 24 may estimate the chromatic dispersion by determining the $m_{opt}$ value for the transform bins of the summed result. Processor 24 may implement such techniques to address clock fading, where a Goddard Clock-Tone may not appear in only one of the frequency domain representations.

Accordingly, processor 24 may receive a frequency domain representation of a combination of one or more input data streams having chromatic dispersion. In some examples, the combination of the one or more input data streams may be an input data stream that represents one polarization of the optical signal (e.g., $y_1(t)$ or $y_2(t)$). In some other examples, the combination of the one or more input data stream may be a combination of one or more input data streams representing a plurality of polarizations of the optical signal (e.g., any one or more of $y_1(t)$ plus $y_2(t)$, $y_1(t)$ minus $y_2(t)$ or vice-versa, $y_1(t)$ plus $j*y_2(t)$, $j*y_1(t)$ plus $y_2(t)$, $y_1(t)$ minus $j*y_2(t)$, and $j*y_1(t)$ minus $y_2(t)$).

The following provides the mathematical basis for why processor 24 may perform a transform on the pointwise multiplication, as described above, to determine the estimation for the chromatic dispersion. In particular, as described in more detail, the FFT on the pointwise multiplication between the complex conjugate values of a first portion of the input signal and a second portion of the input signal may be considered as a mathematical "natural" expression of the Best-Match Search technique.

For instance, the Best-Match Search Technique is mathematically equivalent to FCDE but takes more computations to find the same CD value as the Fast Chromatic Dispersion Estimation (FCDE) technique. In the Best-Match Search Technique, processor 24 utilizes $Y_1(n)$ and $Y_2(n)$ to estimate the chromatic dispersion. For example, processor 24 multiplies $Y_1(n)$ and $Y_2(n)$ with the inverse of the function of the chromatic dispersion ($w_k(f)$). As described above, $w_k(f)$ equals $\exp(-jkf^2)$. The digital domain equation of $w_k(f)$ (i.e., $w_k(n)$) may be $\exp(-jkRs^2n^2/N^2)$, where f equals $Rs*n/N$, where Rs is the sampling rate. Also, as described above, k equals $(\pi\lambda^2/c)(DL)$. Therefore, $w_k(n)$ equals $\exp(-j((\pi\lambda^2/c)(DL))Rs^2n^2/N^2)$.

The result of the multiplication of $Y_1(n)$ to $w_k(n)$ equals $Y_1(n)\exp(-j((\pi\lambda^2/c)(DL))Rs^2n^2/N^2)$, and the result of the multiplication of $Y_2(n)$ to $w_k(n)$ equals $Y_2(n)\exp(-j((\pi\lambda^2/c)(DL))Rs^2n^2/N^2)$. In the Best-Match Search Technique, processor 24 may determine the power of the spectrum of the function resulting from $Y_1(n) w_k(n)$, and $Y_2(n) W_k(n)$. For instance, let $Y_1'(n)$ equal $Y_1(n) w_k(n)$, and let $Y_2'(n)$ equal $Y_2(n) W_k(n)$. Substituting $Y_1'(n)$ for Y in equation 4 results in:

$$C1(N/2) = \left| \sum_{n=0}^{N/2-1} Y1'^*(n) Y1'(n+N/2) \right|^2 \quad \text{(equation 5)}$$

Also, substituting $Y2'(n)$ for Y in equation 4 results in:

$$C2(N/2) = \left| \sum_{n=0}^{N/2-1} Y2'^*(n) Y2'(n+N/2) \right|^2 \quad \text{(equation 6)}$$

For purposes of illustration, the equation of C1(N/2) is further simplified below. The equation for C2(N/2) would simplify in a similar manner. For example, by substituting the equation of $Y_1'(n)$ into equation 5 (i.e., substituting $Y_1(n)*\exp(-j((\pi\lambda^2/c)(DL))Rs^2n^2/N^2)$, equation 5 becomes:

$$C1_k\left(\frac{N}{2}\right) = \quad \text{(equation 7)}$$

$$\left| \sum_{n=0}^{\frac{N}{2}-1} Y1^*(n) \exp\left(+j\left(\frac{\pi\lambda^2}{c}DL\right)R_s^2 n^2 N^2\right) Y1\left(n+\frac{N}{2}\right) \exp\left(-j\left(\frac{\pi\lambda^2}{c}DL\right)R_s^2\left(n+\frac{N}{2}\right)^2 \bigg/ N^2\right) \right|^2$$

By rearranging the terms inside the summation operator and expanding the exp(n+N/2)² equation 7 may be rewritten as:

$$C1_k(N/2) = \left| \sum_{n=0}^{N/2-1} \exp\left(-j\left(\frac{\pi\lambda^2}{c}DL\right)R_s^2/4\right)\exp\left(-j\left(\frac{\pi\lambda^2}{c}DL\right)R_s^2 n/N\right)Y1^*(n)Y1(n+N/2) \right|^2$$

(equation 8) where the exponential terms in n² have cancelled each other.

In equation 8, the first exponential term is not a function of n and can be placed outside the summation operator. Equation 8 can be rewritten as:

$$C1_k(N/2) = \left| \exp\left(-j\left(\frac{\pi\lambda^2}{c}DL\right)R_s^2/4\right) \sum_{n=0}^{N/2-1} \exp\left(-j\left(\frac{\pi\lambda^2}{c}DL\right)R_s^2 n/N\right)Y1^*(n)Y1(n+N/2) \right|^2 \quad \text{(equation 9)}$$

In equation 9, the exponential outside the summation operator may only affect phase. As described above, the amount of chromatic dispersion added by optical link 26 may be based on the value of DL that maximizes the power of the Goddard Clock-Tone.

Because the exponential outside the summation operator affects only the phase, its value may not affect which value of DL results in maximizing $C1_k(N/2)$, and therefore can be dropped. In other words, decause the techniques may be directed to determining the magnitude, which is not affected by phase, the exponential may be dropped. In this case, equation 9 may simplify to:

$$C1_k(N/2) = \left| \sum_{n=0}^{N/2-1} \exp\left(-j\left(\frac{\pi\lambda^2}{c}DL\right)R_s^2 n/N\right)Y1^*(n)Y1(n+N/2) \right|^2 . \quad \text{(equation 10)}$$

Substituting M equals N/2, equation 10 simplifies to:

$$C1_k(M) = \left| \sum_{n=0}^{M-1} \exp\left(-j\left(\frac{\pi\lambda^2}{c}DL\right)R_s^2 n/(2M)\right)Y1^*(n)Y1^*(n)Y1(n+M) \right|^2 . \quad \text{(equation 11)}$$

It may be possible in the Best-Match Technique for processor 24 to sweep through values of DL until processor 24 identifies the value of DL that maximizes C1(M). However, such sweep may result in processor 24 performing more steps with the Best-Match Technique described above, than with FCDE. In aspects of this disclosure, rather than sweeping through values of DL in linear increments, processor 24 may exploit transform techniques in FCDE to sweep through the values of DL, which may result in a faster sweep through values of DL. For example, the Best-Match sweep is completely extraneous and requires incremental changes in the value of DL for identifying the value of DL that maximizes C1(M). In the FCDE techniques, the transform (e.g., the FFT) may automatically provide a sweep of the DL values, so processing time is not wasted in incrementally changing the DL value.

For example, equation 11 may be analogous to the equation for determining a discrete-Fourier transform. For instance, the equation for an DFT is:

$$X_m = \sum_{n=0}^{M-1} x_n \exp(-j2\pi mn/M) = FFT\{x_n\}, \quad \text{(equation 12)}$$

where $x_n$ is usually the time domain samples and $X_m$ is usually the frequency domain samples.

It should be noted that an FFT efficiently implements the DFT. Accordingly, although the equation is described as that for a DFT, processor 24 may implement an FFT. Furthermore, rather than a DFT, processor 24 may perform an inverse DFT. For example, although the ordering and the scaling of the values may be different, it may be possible to reconstruct the same values using an inverse DFT, as using a DFT. Similarly, processor 24 may implement an inverse FFT, rather than an FFT. Therefore, in the example techniques described in this disclosure, processor 24 may apply a transform to the point-wise multiplication, where the transform may be any one of an FFT, a DFT, an inverse FFT, and an inverse DFT, as a few examples; although, other types of transforms may also be possible.

Comparing equation 12 to equation 11, it may be seen that equation 11 can be rewritten as a discrete-Fourier transform (DFT). Again, a fast Fourier transform (FFT) is a more efficient transform than a DFT, and processor 24 may perform the FFT to achieve the same results as performing the DFT.

For instance, equation 11 can be rewritten as:

$$C1_{DL}(M) = \left| \sum_{n=0}^{M-1} Y1^*(n)Y1(n+M)\exp\left(-j2\pi\left(\frac{\lambda^2 R_s^2 DL}{4c}\right)n/M\right) \right|^2.$$ (equation 13)

Let m equal $\lambda^2 Rs^2 DL/4c$ in equation 13. In this case, C1(M) may be rewritten as:

$$C1_m(M) = FFT\{Y1^*(n)Y1(n+M)\}^2 = Z1(n)^2$$ (equation 14).

In the techniques described in this disclosure, processor 24 may determine the FFT as indicated in equation 14 to reduce the total number of computations that are necessary to determine an estimation of the chromatic dispersion. For example, as described above, processor 24 may determine the complex conjugate values of a first portion of $Y_1(n)$, represented as Y1* in equation 14. Processor 24 may pointwise multiply the complex conjugate values with a second portion, represented as Y1(n+M) in equation 14. Processor 24 may then apply a transform to results of the pointwise multiplication, and in some examples, determine a power of the transform, as shown in equation 14.

In other words, equation 14 may represent the equation that processor 24 implements as part of the FCDE technique. In this case, the linear incremental sweep through values of DL with the Best-Match Technique is performed with fewer computations by an FFT sweep of the values of DL with FCDE. In this manner, the FCDE techniques may minimize the amount of time it takes processor 24 to estimate the chromatic dispersion, and therefore, reduce the total time it takes processor 24 to determine the coefficients for the chromatic dispersion filters 30A and 30B as compared to examples where processor 24 implements the Best-Match Search Technique.

For example, as described above, in the Best-Match Technique, processor 24 may sweep through many values of DL each utilizing all values of n from 0 to (N/2)−1 to identify the value of DL that maximizes C1(M). The values of DL that maximize C1(M) may be the estimation of the chromatic dispersion on $I_1Q_1$ data stream 20. By determining the FFT as indicated in equation 14, in accordance with the FCDE techniques, processor 24 may not need to sweep through values of DL across all values of the transform bin "n." Instead, processor 24 may determine the value of m that maximizes the value of C1(M). The value of m may range from −M/2 to M/2 because m may be the axis bin (e.g., transform bin) for the result of the FFT in equation 14. In this manner, processor 24 may utilize the full resolution of the FFT size (i.e., −M/2 to M/2) to identify the value of m that maximizes C1(M). The FFT size, in this example, may be the same as the number of bins used for the FFT.

The value of m is proportional to DL because m equals $\lambda^2 Rs^2 DL/4c$. In other words, DL equals $4c^*m/(\lambda^2 Rs^2)$, where m goes from −M/2 to M/2. Therefore, the value of m that maximizes C1(M) may be proportional to the value of DL that maximizes C1(M). In aspects of this disclosure, rather than identifying the value of DL that maximizes C1(M), as done with the Best-Match Technique, processor 24, in accordance with the FCDE technique, determines the value of m that maximizes C1(M). The value of m that maximizes C1(M) may be referred to as $m_{opt}$.

In this example, $m_{opt}$ may be the transform bin value of the transform for a maximum value from the results of the transform. For instance, C1(M) may be considered as the results of the transform (e.g., the FFT), and processor 24 may determine a transform bin value ($m_{opt}$) of the transform for the maximum value from the results of the transform (C1(M)).

From the determined value of $m_{opt}$, processor 24 may determine the value of DL that maximizes C1(M) because DL equals $4c^*m/(\lambda^2 Rs^2)$. The value of DL that maximizes C1(M) may be referred to as $DL_{opt}$. Accordingly, $DL_{opt}$ equals $4c^*m_{opt}/(\lambda^2 Rs^2)$. In this example, $DL_{opt}$ may be an estimation of the chromatic dispersion on $I_1Q_1$ data streams 20. In other words, processor 24 may determine an estimation of the chromatic dispersion from the determined transform bin value. For instance, processor 24 may determine $DL_{opt}$ from $m_{opt}$.

As described above, equation 14 may be considered as the natural expression of the Best-Match Technique. In this example, the FFT of the product of $Y_1^*(n)Y_1(n+M)$ provides an automatic sweep of the value of DL over a range of $+/-N^*c/(\lambda^2 Rs^2)$, and a resolution of $4c/(\lambda^2 Rs^2)$. Equation 14 indicates that the FCDE techniques described in this disclosure may be mathematically identical to the Best-Match Technique. However, by exploiting transforms (e.g., DFTs, inverse DFTs, FFTs or inverse FFTs), processor 24 may be able to determine an estimation of the chromatic dispersion using fewer operations, which allows processor 24 to determine an estimation of the chromatic dispersion more quickly as compared to the Best-Match Technique.

From the determination of the estimation of the chromatic dispersion (e.g., $DL_{opt}$), processor 24 may determine filter tap coefficients for CD filters 30A and 30B. For example, as described above, the transfer function for chromatic dispersion may be $\exp(jkf^2)$, where "j" is the imaginary number, "f" is frequency, "k" equals $(\pi\lambda^2/c)(DL)$, $\lambda$ is the wavelength of the optical carrier, c is the speed of light, and DL is the cumulative chromatic dispersion usually given in units of ps/nm. Also, as described above, to compensate for the chromatic dispersion, CD filters 30A and 30B may multiply the input data streams (e.g., $I_1Q_1$ data streams 20 and $I_2Q_2$ data streams 21) with the inverse of the chromatic dispersion transfer function (i.e., $\exp(-jkf^2)$).

From the FCDE techniques described above, processor 24 may determine the value of k equals $(4\pi/Rs^2) m_{opt}$, where $m_{opt}$ is obtained from the peak of C(M), and from the value of k, processor 24 may determine values for $\exp(-jkf^2)$ for different values of f. The resulting values (e.g., the results of the $\exp(-jkf^2)$ for different values of f) may be the filter tap coefficients for CD filters 30A and 30B. For example, the filter tap coefficients may equal $\exp(-j\pi m_{opt}(n/M)^2)$. In FIG. 2, the filter tap coefficients are represented as $a_1$ and $a_2$ for CD filters 30A and 30B, respectively. In some examples, because the amount of chromatic dispersion on $I_1Q_1$ may be the same as on $I_2Q_2$, the filter tap coefficients ($a_1$ and $a_2$) may be substantially the same; however, aspects of this disclosure are not so limited.

In the example techniques described in this disclosure, for CD filters 30A and 30B, processor 24 may determine filter tap coefficient values (e.g., $a_1(f)$ and $a_2(f)$), and transmit the filter tap coefficients values to multiplier 36A and multiplier 36B, respectively. Multiplier 36A and multiplier 36B may multiply respective filter tap coefficient values to frequency domain representations of $I_1Q_1$ data streams 20 (i.e., $Y_1(f)$) and $I_2Q_2$ data streams 21 (i.e., $Y_2(f)$).

As illustrated in FIG. 2, the output of multiplier 36A is $a_1Y_1$, and the output of multiplier 36B is $a_2Y_2$. Because the $a_1$ and $a_2$ filter tap coefficients are coefficients to compensate for the chromatic distortion, the output of multiplier 36A may be a frequency domain representation of $I_1Q_1$ data streams 20 without chromatic dispersion. Similarly, the output of multiplier 36B may be a frequency domain representation of $I_2Q_2$ data streams 21 without chromatic dispersion.

Inverse FFT modules 38A and 38B receive the outputs from multipliers 36A and 36B, respectively, and convert the frequency domain representations back into time domain representations. For example, the output of inverse FFT module 38A (i.e., $z_1$) may be $I_1Q_1$ data streams 20 without the chromatic dispersion, and the output of inverse FFT module 38B (i.e., $z_2$) may be $I_2Q_2$ data streams 21 without the chromatic dispersion.

In this manner, to compensate for chromatic dispersion, CD filter 30A may convert a time domain representation of an input data stream having chromatic dispersion into a frequency domain representation of the input data stream having the chromatic dispersion. For example, FFT module 32A may perform an FFT on $I_1Q_1$ data streams 20 to convert $I_1Q_1$ data streams 20 having the chromatic dispersion into a data stream in the frequency domain having the chromatic dispersion ($Y_1(n)$).

Processor 24 receives the frequency domain representation of an input signal having chromatic dispersion. For example, processor 24 receives $Y_1$, as illustrated in FIG. 2. Processor 24 may determine complex conjugate values for a first portion of the frequency domain representation of the input signal. Processor 24 may pointwise multiply the complex conjugate values for the first portion with a second portion of the frequency domain representation of the input signal. Processor 24 may then implement a transform on results of the pointwise multiplication. For example, as described above with respect to equation 14, processor 24 may perform the FFT of the product of $Y_1^*(n)Y_1(n+M)$. Processor 24 may perform similar functions for $I_2Q_2$ data streams 21, in some examples.

Processor 24 may then sweep through the transform bins to identify the maximum of the FFT. From the identified bin value, processor 24 may determine filter tap coefficients that CD filters 30A and 30B are to apply to compensate for the chromatic dispersion. For example, from the identified bin value, processor 24 may determine an estimation of the chromatic dispersion, and from the estimate of the chromatic dispersion, processor 24 may determine the filter tap coefficients for CD filters 30A and 30B.

As described above, to determine an estimation of the chromatic dispersion, from which processor 24 determine filter tap coefficients, processor 24 determines the maximum value from among the transform bins of the FFT. However, aspects of this disclosure are not so limited. In some examples, processor 24 may determine a minimum value for estimating the chromatic dispersion.

For example, as described above, the Goddard Clock-Tone appears at frequency $f_b$ that equals R. The FCDE techniques estimate the chromatic dispersion by determining values that maximize the Goddard Clock-Tone (e.g., the peak values of the FFT and the transform bin associated with the peak value, from which processor 24 estimates the chromatic dispersion). However, it has been proposed that rather than maximizing the Goddard Clock-Tone at frequency $f_b$ equals R, it may be possible to evaluate at a frequency other than $f_b$ equals R. In this case, rather than maximizing, the value that minimizes the FFT result may be used to determine an estimation of the chromatic dispersion.

For instance, the document "Chromatic Dispersion Estimation in Digital Coherent Receivers" by R. A. Soriano, F. N. Hauske, N. G. Gonzalez, Z. Zhang, Y. Ye, I. T. Monroy, and published in J. Lightwave Technol., vol. 29, no. 11, Jun. 1, 2011, the content of which is incorporated by reference in its entirety, discusses techniques to estimate chromatic dispersion by minimizing the power value at a frequency other than R, where R is the baud rate of the optical signal. The document refers to a term "$J_{min}$" which it refers to as a cost function, and refers to a term "$J_{max}$," which is similar to the Goddard Clock-Tone. The document discusses minimizing power at one or more frequencies other than the baud rate, instead of maximizing power at the baud rate R to estimate chromatic dispersion.

However, the techniques described in this document may still rely upon auto-correlation functions for determining the minimum of the power. As described above, the auto-correlation may require steps such as a linear search, which may be negatively impact processing efficiency. The FCDE techniques described in this disclosure may also be applied to the techniques described in document "Chromatic Dispersion Estimation in Digital Coherent Receivers" by R. A. Soriano et al. In this case, the FCDE techniques, as implemented by processor 24, may determine the minimum of the result of the FFT, determine the transform bin for the minimum result, and determine the estimation of the chromatic dispersion from the transform bin value. Processor 24 may then determine the filter tap coefficients in a manner similar to that discussed above.

The Best-Match Technique may utilize $3NN_{CD}/2$ complex multiplies to estimate the chromatic dispersion, where N is the number of frequencies and $N_{CD}$ is the number of dispersion values searched. A typical search includes several hundred values of $N_{CD}$ and several thousand values of N. In examples described in this disclosure, with the FCDE technique, processor 24 may estimate the chromatic dispersion utilizing $N(1+\log_2(N))/2$ complex multiplies, where $(1+\log_2(N)) \ll 3N_{CD}$ typically.

In some examples, processor 24 may configure CD filters 30A and 30B with newer filter tap coefficient values determined based on the FCDE method at regular intervals in time. Because the chromatic dispersion on an established optical link 26 may change very slowly over time, processor 24 may not need to update the filter tap coefficient values that often. For example, processor 24 and modem 28 may take N samples from $I_1Q_1$ data streams 20 and $I_2Q_2$ data streams 21 in the time $T_N$ and compute the CD filter coefficients in the time $T_{FCDE}$ determined by the number of computations required by the FCDE method. Processor 24 may then update the CD filter coefficients in CD filter 30A and CD filter 30B at a repetitive interval $T_{UF}=T_N+T_{FCDE}$. This interval $T_{UF}$ may be relatively large, but can still be less than the update interval $T_{UB}$ which would be required by the Best-Match Technique described above.

As indicated above, $DL_{opt}$ (i.e., the cumulated chromatic distortion) equals $4c^*m_{opt}/(\lambda^2 Rs^2)$. Accordingly, the resolution of $DL_{opt}$ is a function of the sampling rate (Rs). Table 1 below illustrates the resolution of $DL_{opt}$ as a function of the sampling rate (Rs). In Table 1, k is 1550 nm.

TABLE 1

| Sampling Rate (Rs) in GSamples/s | DL resolution (ps/nm) |
| --- | --- |
| 10 | 4991.3 |
| 20 | 1247.8 |
| 30 | 554.6 |
| 40 | 312.0 |
| 50 | 199.7 |
| 60 | 138.6 |
| 70 | 101.9 |
| 80 | 78.0 |

In some examples, the symbol rate for an optical signal at approximately 100 Gbps with PM-QPSK modulation is in the 28 to 32 Gbaud range. As per the Nyquist criterion, the sampling rate may be at least twice that symbol rate. As one example, sampling rate may be between 56 to 64 Gbaud, which results in approximately 120 to 160 ps/nm resolution for DL.

The maximum amount of chromatic dispersion that CD filters 30A and 30B may be able to compensate for may be based on the length of the FFT. For example, to determine the filter tap coefficients, processor 24 may sweep across the transform bins of the FFT, where the number of bins in the FFT is based on the length of the FFT. The more bins there are in the FFT allows processor 24 to estimate higher levels of chromatic dispersion. For example, as described above, DL (i.e., the accumulated chromatic distortion) equals $4c^*m/(\lambda^2 Rs^2)$, where m equals $-M/2$ to $M/2$, and where M represents the length of the FFT. An increase in the length of the FFT results in an increase the range of DL.

Table 2 below illustrates the relationship between FFT length and maximum DL range. In Table 2, $\lambda$ is 1550 nm, and the sampling rate (Rs) is 60 GSamples/s.

TABLE 2

| FFT length (points) | Maximum DL range (+/− ps/nm) |
| --- | --- |
| 128 | 4,437 |
| 256 | 8,874 |
| 512 | 17,747 |
| 1024 | 35,495 |
| 2048 | 70,990 |
| 4096 | 141,980 |
| 8192 | 283,959 |

Figure 3:
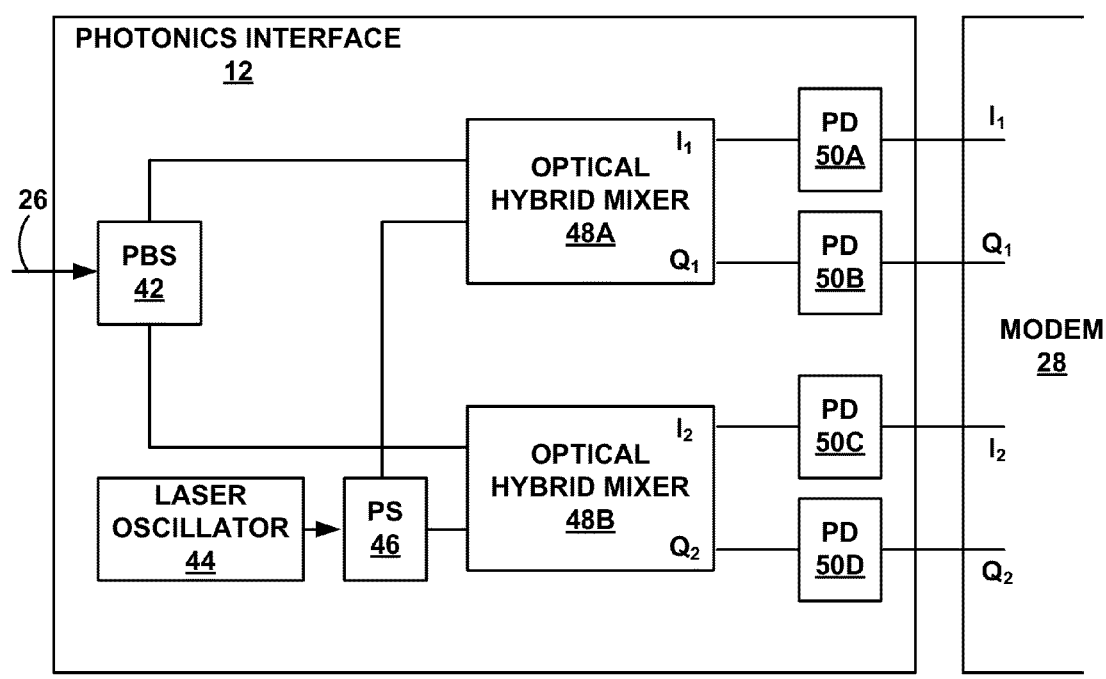
FIG. 3 is a block diagram illustrating examples of photonic components within a photonics interface.

FIG. 3 is a block diagram illustrating examples of photonics components within the photonics interface 12. For example, FIG. 3 illustrates components of photonics interface 12 that receive an optical signal from network 30 via optical link 26, convert the optical signal into $I_1Q_1$ data streams 20 and $I_2Q_2$ data streams 21, and transmit the $I_1Q_1$ data streams 20 and $I_2Q_2$ data streams 21 to modem 28.

Furthermore, the components of photonics interface 12 are illustrated for PM-QPSK modulation. Photonics interface 12 may include additional, fewer, or different components than those illustrated based on the desired PM-QPSK modulation. In some examples, photonics interface 12 may include components for BPSK modulation, M-QAM where M>4, and OFDM. These components may be similar or different from the components illustrated in FIG. 3.

As illustrated in FIG. 3, the receive photonics of photonics interface 12 include polarization beam splitter (PBS) 42, laser oscillator 44, polarization splitter (PS) 46, optical hybrid mixers 48A and 48B, and photo-detectors (PDs) 50A-50D. PDs 50A-50D convert the magnitude of the optical signal to an electrical representation. PBS 42 receives an optical signal from network 30 via optical link 26 and splits the received optical signal into first and second optical signals with nominally orthogonal polarization (e.g., substantially orthogonal polarization). Each one of optical hybrid mixers 48A and 48B receive respective optical signals from the first and second nominally orthogonal optical signals from PBS 42.

The receive photonics also include local oscillator 44, which is a laser. Local oscillator 44 provides the phase reference required in coherent systems to recover the PM-QPSK optical waveform that photonics 12 receives. In some examples, local oscillator 44 may be a free running oscillator. For example, the laser signal outputted by local oscillator 44 may not need to be phase-locked with the optical signal that PBS 42 receives.

Polarization splitter (PS) 46 receives the laser from local oscillator 44 and splits the light into (at least) first and second light paths. As illustrated, each one of optical hybrid mixers 48A and 48B receive respective local oscillator light from the first and second light paths from the PS 46. In some examples, the location of PBS 42 and PS 46 may be swapped with no loss of functionality, provided the light from local oscillator 44 is split into two nominally orthogonally polarized lightwaves.

Optical hybrid mixers 48A and 48B each mix the respective optical signals from PBS 42 with the respective local oscillator lightwave reference from PS 46 and output optical data stream representing in-phase (I) and quadrature-phase (Q) components of the PM-QPSK modulated signal. For example, optical hybrid mixer 48A outputs $I_1$ and $Q_1$ optical data streams. Optical hybrid mixer 48B outputs $I_2$ and $Q_2$ optical data streams. In some examples, optical hybrid mixers 48A and 48B may be 90 degree optical hybrid mixers. Also, in some examples, each one of the $I_1$, $Q_2$, $I_2$, and $Q_2$ data streams may be differentially encoded data streams.

Photo-detectors 50A-50D receive respective ones of the $I_1$, $Q_2$, $I_2$, and $Q_2$ optical data streams and convert these optical signals into electrical signals (e.g., the $I_1$, $Q_1$, $I_2$, and $Q_2$ data streams that processor 24 receives). Photo-detectors 50A-50D may be composed of a single photo-diode or a pair of nominally balanced photo-diodes. A transimpedence amplifier (TIA) element for each photo-detector may used to convert photo-current from the photo-diode(s) to a voltage representation. However, the inclusion of TIA elements may not be necessary in every example. The electrical output of each photo-detector in 50A-50D can be single-ended or differential electrical signals. In some examples, the TIA elements may include automatic gain control (AGC) amplifiers, or the AGC amplifiers may be external to the TIA elements. The AGC amplifiers may nominally maintain output electrical voltage amplitude/swing for varying input electrical current amplitude/swings.

In this manner, the receive photonics of photonics interface 12 convert the PM-QPSK modulated optical signal into the electrical I and Q data stream pairs (e.g., the $I_1$, $Q_1$, $I_2$, and $Q_2$ data streams) representing the optical PM-QPSK signal for further processing by modem 28 and processor 24. For example, modem 28 receives the $I_1$, $Q_1$, $I_2$, and $Q_2$ electrical data stream pairs from photo-detectors 50A-50D through the $I_1Q_1$, data streams 20 and $I_2Q_2$ data streams 21. The $I_1Q_1$ data streams 20 and $I_2Q_2$ data streams 21 that photonics interface 12 outputs include electrical representation of the chromatic dispersion.

For example, the optical signal that photonics interface 12 receives includes the chromatic distortion, and the electrical data streams outputted by photonics interface 12 have the chromatic distortion. As described above, processor 24 and CD filters 30A and 30B of modem 28 compensate for the chromatic distortion that is electrically represented on the electrical data streams outputted by photonics interface 12.

Figure 4:
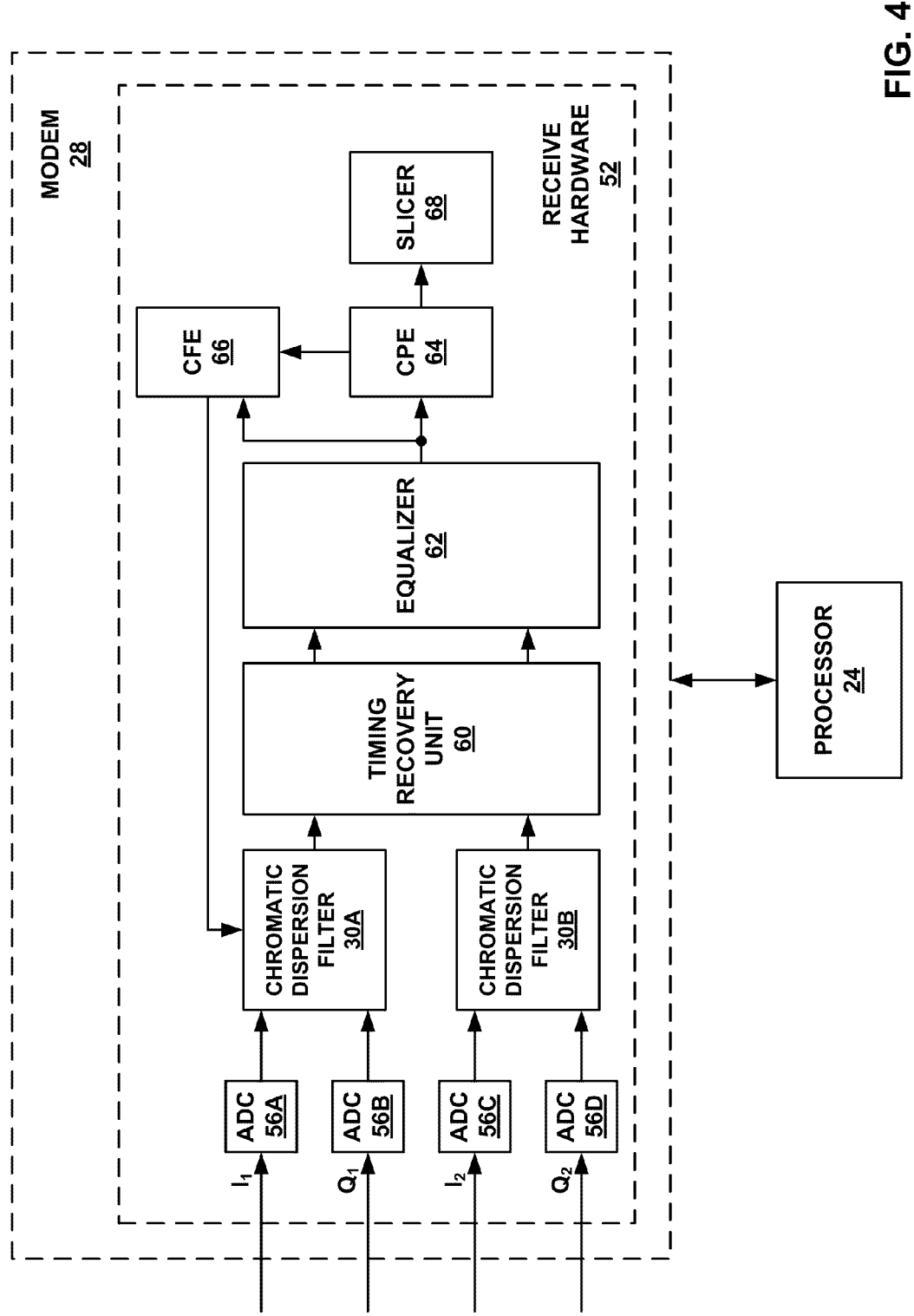
FIG. 4 is a block diagram illustrating an example of a modem of FIG. 1 in further detail.

FIG. 4 is a block diagram illustrating an example of modem 28 of FIG. 1 in further detail. As illustrated, modem 28 includes receive hardware 52. For example, receive hardware 52 includes electric components for reception of the electrical I and Q data stream pairs from photonics interface 12. Receive hardware 52 includes analog-to-digital converters (ADCs) 56A-56D, chromatic dispersion filters 30A and 30B, timing recovery unit 60, equalizer 62, carrier phase estimation (CPE) unit 64, carrier frequency estimation (CFE) unit 66, and slicer 68. The output of slicer 68 may be a relatively high data rate electrical data stream. Chromatic dispersion (CD) filters 30A and 30B may be substantially similar to CD filters 30A and 30B of FIG. 2.

ADCs 56A-56D are input units of modem 28 that receive data via $I_1Q_1$ data streams 20 and $I_2Q_2$ data streams 21 from photonics interface 12. For example, each of ADCs 56A-56D receive one of the $I_1$, $Q_1$, $I_2$, and $Q_2$ electrical data streams from photonics interface 12, and convert the analog data streams into digital data streams. Chromatic dispersion filter 30A receives one pair of the I/Q data streams (i.e., $I_1$ and $Q_1$ data streams), and chromatic dispersion filter 30B receives another pair of the I/Q data streams (i.e., $I_2$ and $Q_2$ data streams). Chromatic dispersion filter 30A and chromatic dispersion filter 30B implement a complex filter on received data streams to compensate for the optical distortion from chromatic dispersion that is represented electrically on the pairs of the I/Q digitized data streams.

Chromatic dispersion filter 30A implements a complex filter on a first pair of the data streams (e.g., the $I_1$ and $Q_1$ data streams) to compensate for the distortion caused by chromatic dispersion within one polarization mode of optical link 26 (e.g., the distortion from chromatic dispersion caused by the data streams traveling across optical link 26 in one polarization mode). Similarly, chromatic dispersion filter 30B implements a filter on a second pair of the data streams (e.g., the $I_2$ and $Q_2$ data streams) to compensate for the distortion from chromatic dispersion caused by the data streams traveling across optical link 26 in the other polarization mode orthogonal to the first polarization mode.

In this example, the filter that chromatic dispersion filter 30A implements and the filter that chromatic dispersion filter 30B implements are complex digital filters. Also, the filter shape of the digital filters may be determined by the best-match search method or by the FCDE method or by another method to provide best-match search compensation or FCDE compensation or another type of compensation that compensates for the distortion from chromatic dispersion caused by the data streams traveling across optical link 26 in one polarization mode or the orthogonal polarization mode. For example, processor 24 may estimate the amount of chromatic dispersion by FCDE on the data stream pairs received respectively by chromatic dispersion filters 30A and 30B and modify the filter shape in chromatic dispersion filters 30A and 30B to provide the appropriate compensation. As another example, chromatic dispersion filters 30A and 30B may be preset with filter shape, and may provide fixed compensation in this case. As yet another example, chromatic dispersion filters 30A and 30B may receive configuration information from processor 24 to modem 28 that indicates the desired filter shape determined by a method other than FCDE. In this example, chromatic dispersion filters 30A and 30B configure the respective filter shapes based on the received configuration information.

Timing recovery unit 60 receives data streams from chromatic dispersion filter 30A and chromatic dispersion filter 30B and performs timing recovery. For example, timing recovery unit 60 may perform symbol timing utilizing interpolation and Timing Error Detector (TED) to achieve symbol timing recovery, although other timing recovery techniques are possible. One example of the timing recovery technique is described in F. M. Gardner, "BPSK/QPSK Timing-Error Detector for Sampled Receivers," IEEE Transactions on Communications, vol. COM-34, No. 5, May 1986, and is incorporated by reference in its entirety. Another example of timing recovery is described in D. N. Godard, "Passband Timing Recovery in an All-Digital Modem Receiver," IEEE Trans. On Comm., vol. Com-26, No. 5, May 1978. The sampling frequency locked clock, generated by timing recovery unit 60, may provide the clock signal for components of processor 24 or for other components of modem 28.

Equalizer 62 receives the data streams from timing recovery unit 60 and performs any residual compensation. For example, chromatic dispersion filter 30A and chromatic dispersion filter 30B may not be able to compensate for all of the chromatic dispersion, and equalizer 62 may compensate for any remaining chromatic dispersion. In addition, equalizer 62 may un-mix the polarization of the received data streams. For example, equalizer 62 may compensate for any polarization mixing in optical link 26 (e.g., mixing between the lightwave with polarization 1 and the lightwave with polarization 2).

Carrier phase estimation unit (CPE) 64 and carrier frequency estimation unit (CFE) 66 fix the phase and the frequency offset (between the signal and the local oscillator) of the data stream. For example, as described above with respect to FIG. 2, local oscillator 44 may be a free-running oscillator. Because local oscillator 44 may be a free-running oscillator, the $I_1$ and $Q_1$ data streams may be orthogonal to one another, and the $I_2$ and $Q_2$ data streams may be orthogonal to one another; however, the phases of each of these data streams may not be fixed. CPE 64 and CFE 66 function in feedback to estimate the frequency and phase between the received signal and local oscillator 44 to track the phase of the data streams. Slicer 68 receives the data streams from CPE 64 and digitizes to binary sequences the data streams for further transmission to other components within modem 28 or other components in processor 24.

Figure 5:
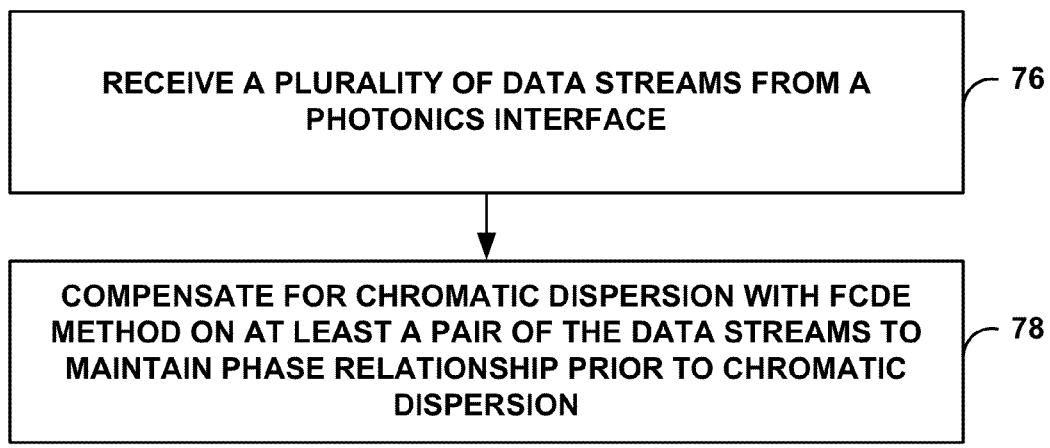
FIG. 5 is a flowchart illustrating an example technique in accordance with one or more aspects of this disclosure.

FIG. 5 is a flowchart illustrating an example technique in accordance with one or more aspects of this disclosure. For example, the technique illustrated in FIG. 4 may be applicable to modem 28 and to processor 24. For purposes of illustration only, reference is made to FIGS. 1 through 4.

Processor 24 and modem 28 receive, from photonics interface 12, a plurality of electrical data streams (e.g., $I_1$, $Q_1$, $I_2$, and $Q_2$) that together represent magnitude and phase information for a received optical signal (e.g., the optical signal received by photonics interface 12) in a coherent optical communication system, the electrical data streams having electrical distortion caused by chromatic dispersion in optical link 26 (76). In this example, the plurality of data streams carry both magnitude and phase information of the optical signal that photonics interface 12 received and that is modulated in accordance with coherent optical communication systems. For example, the coherent optical communication system may require PM-QPSK modulation, and the data streams may be pairs of in-phase and quadrature data streams. However, modulation schemes other than PM-QPSK modulation such as BPSK and mQAM, as examples, are possible.

Processor 24 and modem 28 compensate for the distortion on at least a pair of the electrical data streams together that is caused by at least the chromatic dispersion on optical link 26 to recover the magnitude and phase information of the received optical signal (78). For example, as illustrated in FIG. 2, modem 28 includes chromatic dispersion filter 30A which receives a pair of I and Q data streams (e.g., $I_1$ and $Q_1$). In this example, chromatic dispersion filter 30A compensates for the distortion on the I and Q data streams together that is caused by chromatic dispersion on the data streams traveling across optical link 26.

Figure 6:
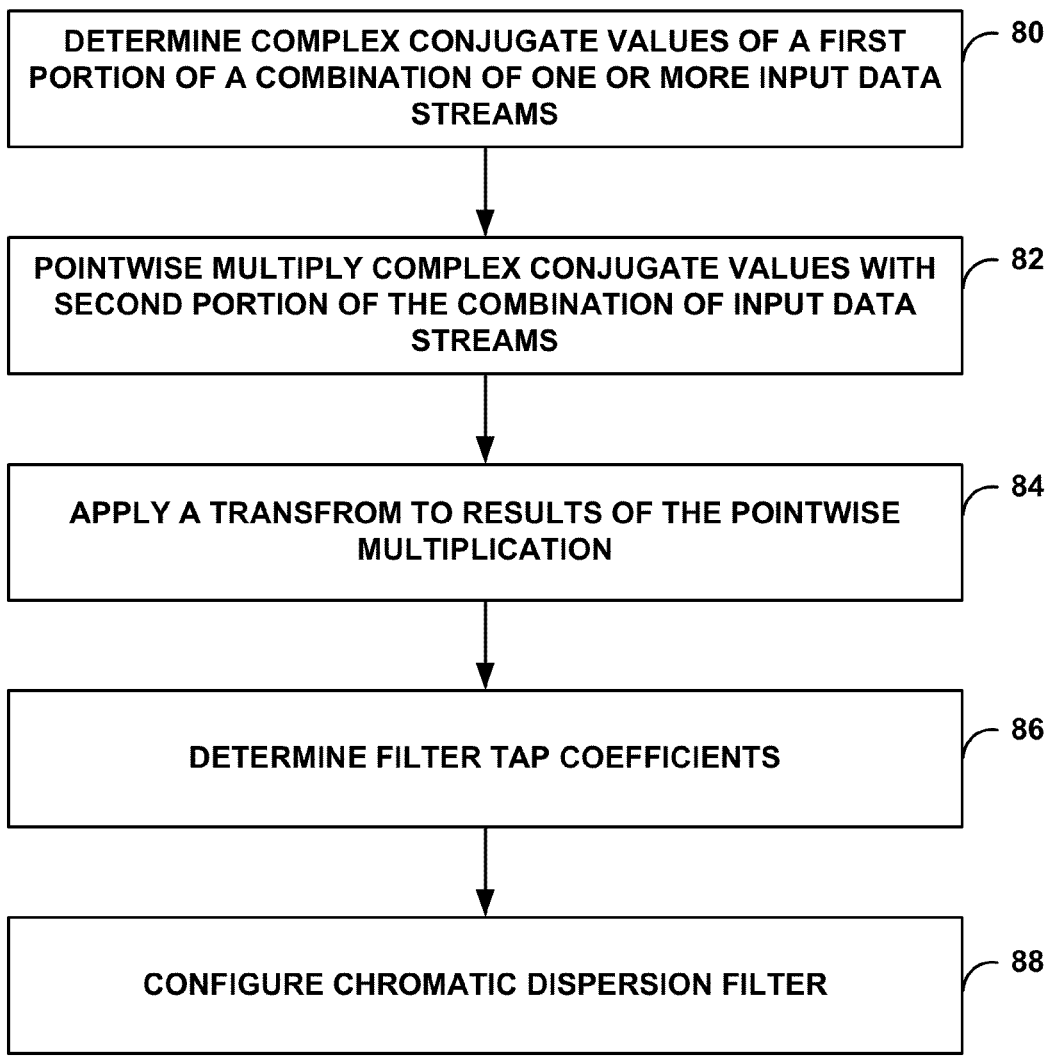
FIG. 6 is a flowchart illustrating another example technique in accordance with one or more aspects of this disclosure.

FIG. 6 is a flowchart illustrating the FCDE technique in accordance with one or more aspects of this disclosure. For example, the technique illustrated in FIG. 6 may be applicable to modem 28 and the controller, an example of which is processor 24. For example, the controller may be considered as configuring portions of modem 28. For purposes of illustration only, reference is made to FIGS. 1 through 4.

The controller may determine complex conjugate values of a first portion of a frequency domain representation of a combination of one or more input data streams having chromatic dispersion (80). For example, $y_1(t)$ data stream may represent $I_1Q_1$ 20 data stream having the chromatic dispersion. Processor 24 may receive the frequency domain representation of the input data stream (e.g., $Y_1(n)$). In other examples, processor 24 may receive the frequency domain representation of any one of $y_1(t)$ plus $y_2(t)$, $y_1(t)$ minus $y_2(t)$ or vice-versa, $y_1(t)$ plus $j*y_2(t)$, $j*y_1(t)$ plus $y_2(t)$, $y_1(t)$ minus $j*y_2(t)$, and $j*y_1(t)$ minus $y_2(t)$, which may be represented as $Y(n)$. For purposes of illustration, the example is described in context of $Y_1(n)$.

Processor 24 may determine complex conjugate values ($Y_1*(n)$) of a first portion (e.g., complex conjugate values of $Y_1(n)$ where n goes from 0 to N/2−1). In this example, N is the transform size (e.g., number of transform bins) for the transform used to convert the time domain representation of the input data stream into a frequency domain representation.

The controller may pointwise multiply the complex conjugate values with a second portion of the frequency domain representation of the combination of one or more input data streams (82). For example, the second portion may include values of $Y_1(n)$ where n goes from N/2 to N−1, which may be represented as $Y_1(n+N/2)$, where n goes from 0 to N/2−1. The pointwise multiplication may refer to processor 24 multiplying the complex conjugate values with corresponding values in the second portion that are N/2 transform bins away. Moreover, in some examples, processor 24 may determine the complex conjugate values for the second portion (e.g., $Y_1*(n+N/2)$) and pointwise multiply the complex conjugate values with the first portion (e.g., $Y_1(n)$).

In either example, the controller may apply a transform to results of the pointwise multiplication (84). The transform may be a discrete-Fourier transform (DFT), an inverse DFT, a fast Fourier transform (FFT), and an inverse FFT. The controller may determine filter tap coefficients for a chromatic dispersion filter (e.g., CD filter 30A or 30B) configured to compensate for the chromatic dispersion of the input data stream based on at least results of the transform (86). The controller may then configure the chromatic dispersion filter (e.g., CD filter 30A or 30B) in accordance with the determined filter tap coefficients (88).

For example, processor 24 may determine an estimation of the chromatic dispersion based on the results of the transform, and may determine the filter tap coefficients based on the estimation of the chromatic distortion. For instance, processor 24 may determine a transform bin value of the transform for a maximum value from the results of the transform (e.g., processor 24 may determine the value of $m_{opt}$, where "m" represents the transform bin values). Processor 24 may determine the estimation of the chromatic dispersion from the determined transform bin value (e.g., processor 24 may determine $DL_{opt}$ from $m_{opt}$). As described above, $DL_{opt}$ equals $4c*m_{opt}/(\lambda^2 Rs^2)$, where c equals a speed of light, $m_{opt}$ equals the transform bin value of the maximum value from the results of the transform, $\lambda$ equals a wavelength of a received optical signal from which the input data stream is derived, and Rs equals a sampling rate of the transform. In alternate examples, it may be possible to determine the minimum value from the results of the transform from which processor 24 determines an estimate of the chromatic dispersion.

Figure 7:
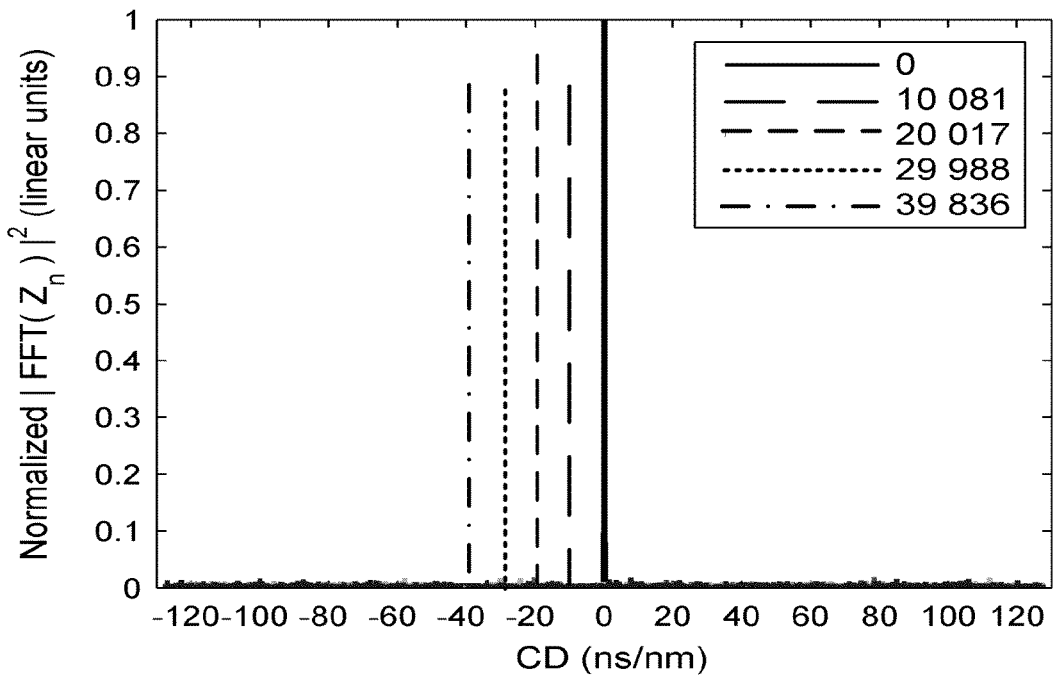
FIG. 7 is a graphical diagram illustrating power of a transform in accordance with one or more aspects of this disclosure.

FIG. 7 is a graphical diagram illustrating power of a transform in accordance with one or more aspects of this disclosure. FIG. 7 illustrates experimental captures of $Y(n)$ where Rs=63 GSamples/s using PM-QPSK and applying equation 14 to determine C1(M). In FIG. 7, the x-axis may be the transform bins (e.g., m) translated in CD units of ns/nm (e.g., $m_{opt}$ converted to $DL_{opt}$). Also, in FIG. 7, the CD is added by concatenating Fiber-Bragg-Grating (FBG) with high dispersion value. The optical-signal-to-noise ratio (OSNR) is swept from 11 to 18 dB (resolution bandwidth of 12.5 GHz). The clock-tone C(M) is calculated for N equals 4096, $\lambda$ equals 1550.116 nm, and Rs equals 63 GSamples/s. In FIG. 7, different chromatic dispersion amounts were tested, as indicated in the legend. These chromatic dispersion amounts were measured by the FBG manufacturer.

Figure 8:
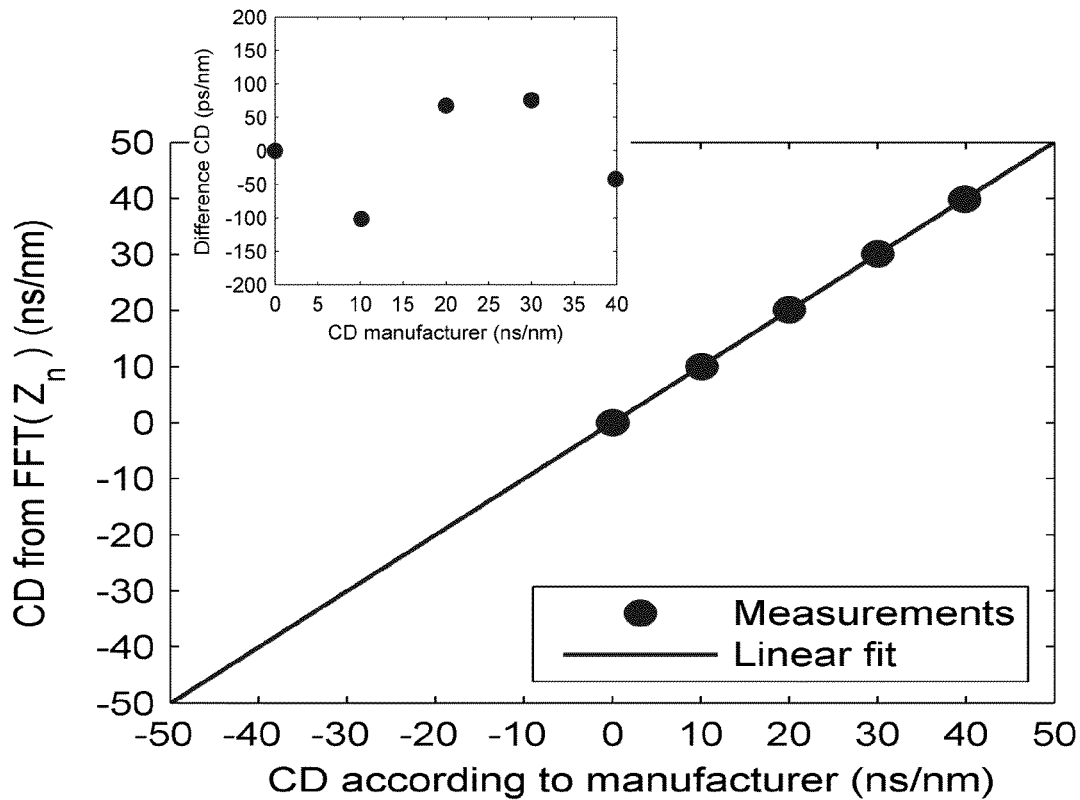
FIG. 8 is a graphical diagram illustrating the estimated chromatic dispersion versus a measured chromatic dispersion.

FIG. 8 is a graphical diagram illustrating the estimated chromatic dispersion versus a measured chromatic dispersion. For example, FIG. 8 illustrates a comparison between the estimated chromatic dispersion utilizing the FCDE techniques described in this disclosure and the measured chromatic dispersion (i.e., measured by the FGB manufacturer). As can be seen in the FIG. 8, the estimated chromatic dispersion is substantially the same as the measured chromatic dispersion.

The inset in FIG. 8, in greater precision, shows the actual difference estimated chromatic dispersion, in accordance with techniques described in this disclosure, and the measured chromatic dispersion. As shown in FIG. 8, the maximum different is about 100 ps/nm for chromatic dispersion ranging from 0 to 40 ns/nm. In other words, the largest error between the estimated chromatic dispersion, utilizing the FCDE techniques, and the measured chromatic dispersion is about 100 ps/nm, which gives a resolution of about 100 ps/nm for Rs approximately 60 GSamples/s, in accordance with Table 1.

The techniques of this disclosure may be implemented in a wide variety of devices or apparatuses, including line-cards, routers, optical interfaces, wireless devices, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units.

Various examples have been described. These and other examples are within the scope of the following claims.

The invention claimed is:

1. A method comprising:
   determining, with a controller, complex conjugate values of a first portion of a frequency domain representation of a combination of one or more input data streams having chromatic dispersion;
   pointwise multiplying, with the controller, the complex conjugate values with a second portion of the frequency domain representation of the combination of the one or more input data streams;

applying, with the controller, a transform to results of the pointwise multiplication;

determining, with the controller, a transform bin value from results of the transform;

determining, with the controller, an estimation of the chromatic dispersion from the determined transform bin value;

determining, with the controller, filter tap coefficients, based on the determined estimation of the chromatic dispersion, for a chromatic dispersion filter configured to compensate for the chromatic dispersion of the one or more input data streams; and configuring, with the controller, the chromatic dispersion filter in accordance with the determined filter tap coefficients.

2. The method of claim 1, further comprising:

receiving a time domain representation of the one or more input data streams; and transforming the time domain representation into the frequency domain representation.

3. The method of claim 2, wherein the frequency domain representation is represented by Y(n), wherein the complex conjugate values of the first portion of the frequency domain representation is represented by values of $Y^*(n)$, where n goes from 0 to N/2−1, wherein the second portion of the frequency domain representation is represented by values of Y(n+N/2), where n goes from 0 to N/2−1, and where N equals a number of transform bins used to transform the time domain representation into the frequency domain representation.

4. The method of claim 3, wherein applying the transform to results of the pointwise multiplication comprises applying the transform with a transform size equal to N/2.

5. The method of claim 2, wherein the frequency domain representation is represented by Y(n), wherein the complex conjugate values of the first portion of the frequency domain representation is represented by values of $Y^*(n+N/2)$, where n goes from 0 to N/2−1, wherein the second portion of the frequency domain representation is represented by values of Y(n), where n goes from 0 to N/2−1, and where N equals a number of transform bins used to transform the time domain representation into the frequency domain representation.

6. The method of claim 1, wherein applying the transform comprises applying at least one of a discrete Fourier transform (DFT), an inverse DFT, a fast-Fourier transform (FFT), and an inverse FFT.

7. The method of claim 1, wherein determining the transform bin value comprises determining the transform bin associated with a maximum value from the results of the transform, and wherein determining the estimation of the chromatic dispersion comprises determining the estimation of the chromatic dispersion from the determined transform bin value associated with the maximum value.

8. The method of claim 7, wherein determining the estimation of the chromatic dispersion from the determined transform bin value comprises determining $4c^*m_{opt}/(\lambda^2 Rs^2)$, where c equals a speed of light, $m_{opt}$ equals the transform bin value associated with the maximum value from the results of the transform, λ equals a wavelength of a received optical signal from which the input data stream is derived, and Rs equals a sampling rate of the transform.

9. The method of claim 1, wherein determining the estimation of the chromatic dispersion comprises determining the estimation of the chromatic dispersion utilizing $0.5N(1+\log_2 N)$ multiplications, where N is a transform size.

10. The method of claim 1, further comprising:

compensating, with the chromatic filter, the chromatic dispersion on the frequency domain representation of the input data stream based on the filter tap coefficients.

11. The method of claim 1, wherein the combination of one or more input data streams having chromatic dispersion comprises an input data stream representing one polarization of an optical signal.

12. The method of claim 1, wherein the combination of one or more input data streams having chromatic dispersion comprises a combination of one or more input data streams representing a plurality of polarizations of an optical signal.

13. The method of claim 1, wherein determining the transform bin value comprises determining the transform bin associated with a minimum value from the results of the transform, wherein determining the estimation of the chromatic dispersion comprises determining the estimation of the chromatic dispersion from the determined transform bin value associated with the minimum value.

14. A controller configured to:

determine complex conjugate values of a first portion of a frequency domain representation of a combination of one or more input data streams having chromatic dispersion;

pointwise multiply the complex conjugate values with a second portion of the frequency domain representation of the combination of the one or more input data streams;

apply a transform to results of the pointwise multiplication;

determine a transform bin value from results of the transform;

determine an estimation of the chromatic dispersion from the determined transform bin value;

determine, based on the determined estimation of the chromatic dispersion, filter tap coefficients for a chromatic dispersion filter configured to compensate for the chromatic dispersion of the one or more input data streams; and configure the chromatic dispersion filter in accordance with the determined filter tap coefficients.

15. The controller of claim 14, wherein the frequency domain representation is represented by Y(n), wherein the complex conjugate values of the first portion of the frequency domain representation is represented by values of $Y^*(n)$, where n goes from 0 to N/2−1, wherein the second portion of the frequency domain representation is represented by values of Y(n+N/2), where n goes from 0 to N/2−1, and where N equals a number of transform bins used to transform a time domain representation into the frequency domain representation.

16. The controller of claim 15, wherein the controller is configured to apply the transform with a transform size equal to N/2.

17. The controller of claim 14, wherein the frequency domain representation is represented by Y(n), wherein the complex conjugate values of the first portion of the frequency domain representation is represented by values of $Y^*(n+N/2)$, where n goes from 0 to N/2−1, wherein the second portion of the frequency domain representation is represented by values of Y(n), where n goes from 0 to N/2−1, and where N equals a number of transform bins used to transform the time domain representation into the frequency domain representation.

18. The controller of claim 14, wherein the controller is configured to apply at least one of a discrete Fourier transform (DFT), an inverse DFT, a fast-Fourier transform (FFT), and an inverse FFT.

19. The controller of claim 14, wherein the controller is configured to:
   determine the transform bin value associated with a maximum value from the results of the transform; and
   determine the estimation of the chromatic dispersion from the determined transform bin value associated with the maximum value.

20. The controller of claim 19, wherein, to determine the estimation of the chromatic dispersion, the controller is configured to determine $4c*m_{opt}/(\lambda^2 Rs^2)$, where c equals a speed of light, $m_{opt}$ equals the transform bin value associated with the maximum value from the results of the transform, $\lambda$ equals a wavelength of a received optical signal from which the input data stream is derived, and Rs equals a sampling rate of the transform.

21. The controller of claim 14, wherein the combination of one or more input data streams having chromatic dispersion comprises an input data stream representing one polarization of an optical signal.

22. The controller of claim 14, wherein the combination of one or more input data streams having chromatic dispersion comprises a combination of one or more input data streams representing a plurality of polarizations of an optical signal.

23. The controller of claim 14, wherein the controller is configured to:
   determine the transform bin value associated with a minimum value from the results of the transform; and
   determine the estimation of the chromatic dispersion from the determined transform bin value associated with the minimum value.

24. A device comprising:
   a modulator-demodulator (modem) comprising a chromatic dispersion filter, the modem configured to receive one or more input data streams having chromatic dispersion, and configured to transform a combination of the one or more input data streams into a frequency domain representation of the combination of the one or more input data streams;
   a controller configured to:
      receive the frequency domain representation of the combination of the one or more input data streams;
      determine complex conjugate values of a first portion of the frequency domain representation of the combination of the one or more input data streams;
      pointwise multiply the complex conjugate values with a second portion of the frequency domain representation of the combination of the one or more input data streams;
      apply a transform to results of the pointwise multiplication;
      determine a transform bin value from results of the transform;
      determine an estimation of the chromatic dispersion from the determined transform bin value;
      determine, based on the determined estimation of the chromatic dispersion, filter tap coefficients for the chromatic dispersion filter configured to compensate for the chromatic dispersion of the one or more input data streams; and
      configure the chromatic dispersion filter in accordance with the determined filter tap coefficients.

25. The device of claim 24, wherein the controller is configured to:
   determine the transform bin value associated with a maximum value from the results of the transform; and
   determine the estimation of the chromatic dispersion from the determined transform bin value associated with the maximum value.

26. The device of claim 25, wherein, to determine the estimation of the chromatic dispersion, the controller is configured to determine $4c*m_{opt}/(\lambda^2 Rs^2)$, where c equals a speed of light, $m_{opt}$ equals the transform bin value associated with the maximum value from the results of the transform, $\lambda$ equals a wavelength of a received optical signal from which the input data stream is derived, and Rs equals a sampling rate of the transform.

27. A modulator-demodulator (modem) comprising:
   a chromatic dispersion filter configured to:
      transmit a frequency domain representation of a combination of one or more input data streams having chromatic dispersion to a controller; and
      receive from the controller filter tap coefficients for compensating the chromatic dispersion that are based on a transform bin value from results of a transform of a pointwise multiplication of complex conjugate values for a first portion of the frequency domain representation of the combination of the one or more input data streams and a second portion of the frequency domain representation of the combination of the one or more input data streams.

28. The modem of claim 27, wherein the modem is configured to:
   receive the one or more input data streams having the chromatic dispersion; and
   transform the combination of the received one or more input data streams into the frequency domain representation of the combination of the one or more input data streams.

29. The modem of claim 27, wherein the chromatic dispersion filter is configured to compensate for the chromatic dispersion on the frequency domain representation based on the filter tap coefficients, and wherein the modem is configured to convert the compensated frequency domain representation into one or more time domain electrical data streams.

30. A method comprising:
   applying, with a controller, a pointwise operation to pairs of data values of a frequency domain representation of a combination of one or more input data streams having chromatic dispersion to produce an intermediate set of data values, wherein each of the pairs of data values includes a first data value associated with a positive frequency of the frequency domain representation, and a second data value associated with a corresponding negative frequency of the frequency domain representation;
   applying, with the controller, a transform to the intermediate set of data values to compute possible chromatic dispersion values;
   determining, with the controller, a transform bin value from a plurality of transform bins resulting from the transform, wherein each of the transform bins is associated with one of the possible chromatic dispersion values;
   selecting, with the controller, a chromatic dispersion value from the determined transform bin value that most closely represents the chromatic dispersion; and
   configuring, with the controller, a chromatic dispersion filter, based on the selected chromatic dispersion value, to compensate for the chromatic dispersion of the one or more input data streams.

31. The method of claim 30, wherein applying the pointwise operation comprises:
- determining complex conjugate values of each of the first data value of the pairs of data values; and
- pointwise multiplying each of the complex conjugate values with each of the second data value of the pairs of data values to produce the intermediate set of data values.

32. The method of claim 30, wherein applying the pointwise operation comprises:
- determining complex conjugate values of each of the second data value of the pairs of data values; and
- pointwise multiplying each of the complex conjugate values with each of the first data value of the pairs of data values to produce the intermediate set of data values.

33. The method of claim 30,
- wherein determining the transform bin value comprises determining the transform bin value associated with a maximum value from the possible chromatic dispersion values, and
- wherein selecting the chromatic dispersion value comprises selecting the chromatic dispersion value from the determined transform bin value associated with the maximum value.

\* \* \* \* \*